United States Patent
Taniguchi et al.

(10) Patent No.: US 11,617,070 B2
(45) Date of Patent: Mar. 28, 2023

(54) COMMUNICATION CONTROL DEVICE, COMMUNICATION CONTROL METHOD AND COMMUNICATION CONTROL SYSTEM

(71) Applicant: NIPPON TELEGRAPH AND TELEPHONE CORPORATION, Tokyo (JP)

(72) Inventors: Atsushi Taniguchi, Tokyo (JP); Kenji Shimizu, Tokyo (JP); Yohei Katayama, Tokyo (JP); Takahiro Yamazaki, Tokyo (JP); Maiko Naya, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/043,597

(22) PCT Filed: Apr. 4, 2019

(86) PCT No.: PCT/JP2019/014946
§ 371 (c)(1),
(2) Date: Sep. 29, 2020

(87) PCT Pub. No.: WO2019/203005
PCT Pub. Date: Oct. 24, 2019

(65) Prior Publication Data
US 2021/0037371 A1 Feb. 4, 2021

(30) Foreign Application Priority Data
Apr. 16, 2018 (JP) .............................. JP2018-078723

(51) Int. Cl.
*H04W 8/00* (2009.01)
*G16Y 10/75* (2020.01)
*H04W 88/08* (2009.01)

(52) U.S. Cl.
CPC ............. *H04W 8/005* (2013.01); *G16Y 10/75* (2020.01); *H04W 88/08* (2013.01)

(58) Field of Classification Search
CPC ..................................................... H04W 8/005
(Continued)

(56) References Cited

U.S. PATENT DOCUMENTS 5,999,526 A * 12/1999 Garland ................ H04L 67/325
370/352
2006/0099954 A1 * 5/2006 Henderson .............. H04L 45/00
455/447

(Continued)

FOREIGN PATENT DOCUMENTS

JP  2011071731 A  4/2011
JP  2012044597 A  3/2012

(Continued)

OTHER PUBLICATIONS

Takahiro Yamazaki et al., Integrated Management Architecture of Future IoT Wireless Access Systems-Wireless Access Virtualization-, The Institute of Electronics, Information and Communication Engineers, vol. 116, No. 508, IEICE Technical Report, MoNA2016-48, Mar. 2017.

*Primary Examiner* — Joel Ajayi
(74) *Attorney, Agent, or Firm* — Harness, Dickey & Pierce, P.L.C.

(57) ABSTRACT

A communication control apparatus includes a communication parameter acquisition unit that acquires at least one second communication parameter that is a candidate for a first communication parameter indicating a communication parameter to be assigned to a communication apparatus and indicates a communication parameter suitable for regional characteristics indicating a communication environment in a region where the communication apparatus is installed, a setting file storage unit that stores a setting file correspond- (Continued)

ing to each second communication parameter, a setting file acquisition control unit that acquires the setting file and stores the acquired setting file in the setting file storage unit, and a communication parameter assignment unit that determines the first communication parameter from among the second communication parameters acquired by the communication parameter acquisition unit and assigns the determined first communication parameter to the communication apparatus.

11 Claims, 17 Drawing Sheets

(58) Field of Classification Search
USPC .......................................................... 455/419
See application file for complete search history.

(56) References Cited

U.S. PATENT DOCUMENTS

| 2008/0026764 | A1* | 1/2008 | Shimura | ............... H04W 8/245 |
| | | | | 455/446 |
| 2009/0046686 | A1* | 2/2009 | Izaki | ....................... H04W 8/20 |
| | | | | 370/338 |
| 2014/0256335 | A1 | 9/2014 | Kobayashi et al. | |
| 2015/0289142 | A1 | 10/2015 | Abeysekera et al. | |

FOREIGN PATENT DOCUMENTS

| JP | 2016158305 A | 9/2016 |
| WO | WO-2013046502 A1 | 4/2013 |

* cited by examiner

| PRIMARY MODULATION SCHEME | SECONDARY MODULATION SCHEME | MULTIPLEXING METHOD | INTERFERENCE CONTROL TECHNOLOGY | ... |
|---|---|---|---|---|
| ASK | DS | TDMA | ICIC | |
| FSK | FH | FDMA | SIC | |
| BPSK | OFDM | CDMA | IRC | |
| QPSK | FBMC | NOMA | CoMP | |
| 64QAM | UFMC | SCMA | Beam forming | ... |
| . | GFDM | PDMA | MLD | |
| . | . | SDMA | . | |
| . | . | . | . | |
| . | . | . | . | |
| . | . | . | . | |

Fig. 2

|  | PRIMARY MODULATION SCHEME | SECONDARY MODULATION SCHEME | MULTIPLEXING METHOD | INTERFERENCE CONTROL TECHNOLOGY | ... |
|---|---|---|---|---|---|
| SETTING PATTERN A | ASK | DS | TDMA | ICIC | ... |
| SETTING PATTERN B | BPSK | FH | FDMA | IRC | ... |
| SETTING PATTERN C | QPSK | OFDM | CDMA | CoMP | ... |
| SETTING PATTERN D | 64QAM | UFMC | PDMA | Beam forming | ... |
| . | . | . | . | . | . |
| . | . | . | . | . | . |
| . | . | . | . | . | . |

Fig. 13

|  | SETTING PATTERN A | SETTING PATTERN B | SETTING PATTERN C | ... |
|---|---|---|---|---|
| MOBILITY CHARACTERISTICS | △ | △ | △ | ... |
| DELAY REQUIREMENT | ○ | △ | △ | ... |
| COMMUNICATION CAPACITY | △ | ○ | △ | ... |
| PEAK DATA AMOUNT | △ | △ | △ | ... |
| NUMBER OF DEVICES | △ | △ | ○ | ... |
| . | . | . | . | . |
| . | . | . | . | . |
| . | . | . | . | . |

Fig. 14

| | MOBILITY CHARACTERISTICS | DELAY REQUIREMENT | COMMUNICATION CAPACITY | PEAK DATA AMOUNT | NUMBER OF DEVICES | | SETTING PATTERN |
|---|---|---|---|---|---|---|---|
| 1 | HIGH SPEED | HIGH | MODERATE (BIDIRECTIONAL) | SMALL | SMALL | ... | SETTING PATTERN A |
| 2 | LOW SPEED | LOW | LARGE (DOWNLINK ONLY) | SMALL | SMALL | ... | SETTING PATTERN B |
| 3 | LOW SPEED | LOW | SMALL (UPLINK ONLY) | SMALL | LARGE | ... | SETTING PATTERN C |
| ... | ... | ... | ... | ... | ... | ... | ... |

Fig. 15

COMMUNICATION CONTROL DEVICE, COMMUNICATION CONTROL METHOD AND COMMUNICATION CONTROL SYSTEM

CROSS-REFERENCE TO RELATED APPLICATIONS

This application is a 371 National Stage of International Application No. PCT/JP2019/014946, filed on Apr. 4, 2019, which claims priority to Japanese Patent Application No. 2018-078723, filed Apr. 16, 2018. The entire disclosures of the above applications are incorporated herein by reference.

TECHNICAL FIELD

The present invention relates to a communication control device, a communication control method and a communication control system.

BACKGROUND ART

It is expected that various types of wireless schemes will be used for various applications in future wireless networks. For example, recent studies are seeking software wireless technology that enables a plurality of IoT service providers to share and use one wireless network. In this case, unlike the case of the wireless communication service provided by one company, the region or time slot where each IoT service provider needs a wireless network may be biased to a specific region or a specific time slot. For this reason, a communication system that can appropriately determine a wireless scheme and a frequency in response to a request from each IoT service provider and start communication without having to determine in advance a wireless scheme to be implemented by an access point and a frequency to operate is being studied (for example, NPL 1).

CITATION LIST

Non Patent Literature

NPL 1: Takahiro Yamazaki, Kenji Shimizu, Atsushi Taniguchi, Keiji Shimizu, "Wireless Access Management System for Efficiently Accommodating Various Wireless Schemes for IoT-Proposal of Integrated Management of Wireless Access Virtualization", IEICE, vol. 116 No. 508 MoNA 2016-48, pp. 309-314, March 2017

SUMMARY OF THE INVENTION

Technical Problem

In order to enable a communication system in which communication is performed by appropriately determining a wireless scheme, an access point needs to acquire a wireless scheme file for implementing the determined wireless scheme each time. A configuration in which a wireless scheme file provided to the access point is managed by one management server requires a wireless file to be frequently downloaded by the access point, and thus a system load and a network load on the management server and the like increase. As a result, it is expected to take a long time to complete the implementation of the wireless scheme at the access point, and thus there is a difficulty in enabling the communication system.

Also, a configuration in which a wireless scheme file is stored in an access point side in advance is required to store all wireless scheme files corresponding to wireless schemes that can be determined.

In this case, it is difficult to secure the storage capacity of the wireless scheme files and to cope with the update of the wireless scheme files, and thus there is a difficulty in enabling the communication system.

The present invention has been made in view of such circumstances, and an object of the present invention is to provide a communication control device, a communication control method and a communication control system that can appropriately determine a communication scheme and perform communication.

Means for Solving the Problem

One aspect of the invention is a communication control apparatus including a communication parameter acquisition unit that acquires at least one second communication parameter that is a candidate for a first communication parameter indicating a communication parameter to be assigned to a communication apparatus and indicates a communication parameter suitable for regional characteristics indicating a communication environment in a region where the communication apparatus is installed, a setting file storage unit that stores a setting file corresponding to each second communication parameter, a setting file acquisition control unit that acquires the setting file and stores the acquired setting file in the setting file storage unit, and a communication parameter assignment unit that determines the first communication parameter from among the second communication parameters acquired by the communication parameter acquisition unit and assigns the determined first communication parameter to the communication apparatus.

One aspect of the present invention is the communication control apparatus described above, in which the setting file acquisition control unit acquires only the setting file that is not stored in the setting file storage unit.

One aspect of the present invention is the communication control apparatus described above, in which the setting file acquisition control unit deletes the setting files other than a setting file corresponding to the second communication parameter acquired by the communication parameter acquisition unit from among the setting files stored in the setting file storage unit.

One aspect of the present invention is the communication control apparatus described above further including a regional characteristic communication parameter correspondence information storage unit that stores regional characteristic communication parameter correspondence information in which the communication apparatus, the regional characteristics, and the communication parameter suitable for the regional characteristics are associated. The communication parameter assignment unit determines the first communication parameter to be assigned to the communication apparatus based on the regional characteristic communication parameter correspondence information stored in the regional characteristic communication parameter correspondence information storage unit.

One aspect of the present invention is the communication control apparatus described above, in which when the regional characteristic communication parameter correspondence information stored in the regional characteristic communication parameter correspondence information storage unit is updated, the communication parameter assignment unit determines the first communication parameter to be assigned to the communication apparatus based on the updated regional characteristic communication parameter correspondence information.

One aspect of the present invention is the communication control apparatus described above, in which when the regional characteristic communication parameter correspondence information stored in the regional characteristic communication parameter correspondence information storage unit is updated, the communication parameter acquisition unit acquires the second communication parameter.

One aspect of the present invention is the communication control apparatus described above, in which the communication parameter assignment unit determines the first communication parameter to be assigned to the communication apparatus based on communication state information indicating a communication state of communication in the communication apparatus.

One aspect of the present invention is the communication control apparatus described above, in which the communication parameter acquisition unit acquires the second communication parameter based on the communication state information.

One aspect of the present invention is the communication control apparatus described above further including a communication state measurement unit that measures the communication state of communication by the communication apparatus and generates the communication state information indicating the measured communication state.

One aspect of the present invention is a communication control method including acquiring at least one second communication parameter that is a candidate for a first communication parameter indicating a communication parameter to be assigned to a communication apparatus and indicates a communication parameter suitable for regional characteristics indicating a communication environment in a region where the communication apparatus is installed, storing a setting file corresponding to each second communication parameter, a setting file acquisition control unit configured to acquire the setting file and cause the acquired setting file to be stored, and determining the first communication parameter from among the acquired second communication parameters and assigning the determined first communication parameter.

One aspect of the present invention is a communication control system including a management apparatus and a communication control apparatus, in which the management apparatus includes a second communication parameter assignment unit configured to assign a second communication parameter that is a candidate for a first communication parameter indicating a communication parameter to be assigned to a communication apparatus and indicates a communication parameter suitable for regional characteristics indicating a communication environment in a region where the communication apparatus is installed, and a setting file transmission unit configured to transmit a setting file corresponding to the second communication parameter to the communication control apparatus in response to a request from the communication control apparatus, and the communication control apparatus includes a communication parameter acquisition unit configured to acquire at least one second communication parameter, a setting file storage unit configured to store the setting file corresponding to the second communication parameter, a setting file acquisition control unit configured to acquire the setting file and store the acquired setting file in the setting file storage unit, and a first communication parameter assignment unit configured to determine the first communication parameter from among the second communication parameters acquired by the communication parameter acquisition unit and assigns the determined first communication parameter to the communication apparatus.

Effects of the Invention

According to the present invention, a communication control device, a communication control method and a communication control system capable of appropriately determining a communication scheme and performing communication can be provided.

BRIEF DESCRIPTION OF DRAWINGS

FIG. 2 is a diagram illustrating an example of various communication settings as components of a wireless scheme.

FIG. 12 is a flowchart illustrating a flow of processing of changing wireless scheme assignment by the communication control system according to the first embodiment based on a communication status, regional characteristics, a wireless environment, and the like.

FIG. 13 is a diagram illustrating an example of a configuration of a setting pattern of a wireless scheme used by the communication control system according to the first embodiment.

FIG. 14 is a diagram illustrating an example of suitability between regional characteristics and setting patterns.

FIG. 15 is a diagram illustrating an example of a table that defines setting patterns assigned to regional characteristics.

DESCRIPTION OF EMBODIMENTS

First Embodiment

Hereinafter, a first embodiment of the present invention will be described with reference to drawings.

First, communication control by a communication control system of the related art will be described to facilitate understanding of the features of the configuration of a communication control system Sa according to the first embodiment described below. In the following description, an access point may be omitted and described as "AP" and a database may be omitted and described as "DB".

Figure 1:
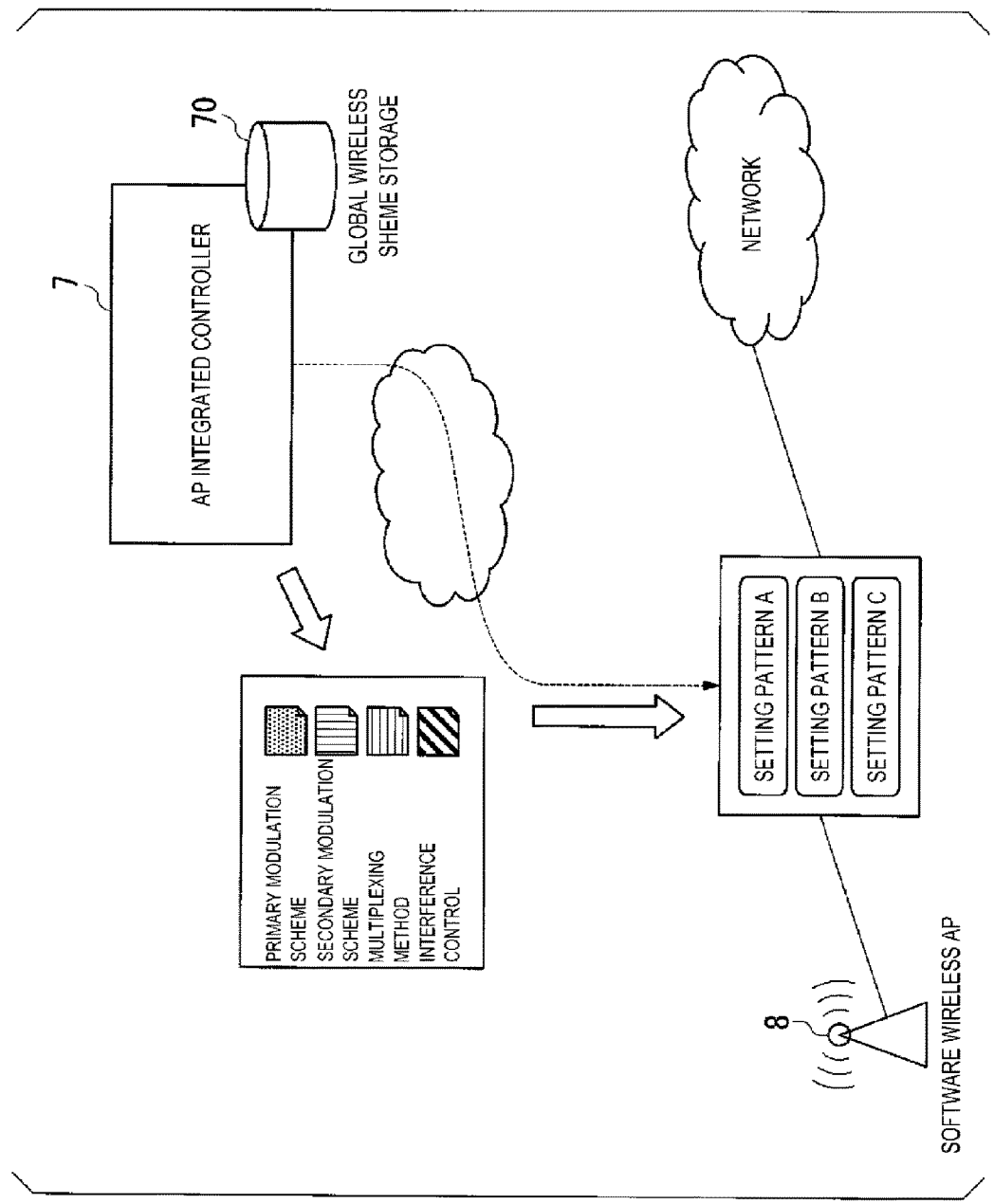
FIG. 1 is a schematic diagram illustrating an example of communication control by a communication control system of the related art.

FIG. 1 is a schematic diagram illustrating an example of communication control by a communication control system of the related art. As illustrated in FIG. 1, the communication control system of the related art includes an AP integrated controller 7 and a software wireless AP 8.

The AP integrated controller 7 and the software wireless AP 8 are communicably connected. In general, the AP integrated controller 7 is communicably connected to each of a plurality of software wireless APs 8, but for simplicity of description, FIG. 1 illustrates only one software wireless AP 8.

The software wireless AP 8 can determine a specific wireless scheme from among various types of wireless schemes by software wireless technology and provide a wireless communication service to a wireless communication terminal (not illustrated). The software wireless AP 8 provides, for example, a wireless communication service by a specific wireless scheme requested by a specific IoT service provider (not illustrated).

The wireless scheme here is a parameter (communication parameter) that is implemented in the software wireless AP 8 based on a combination of various communication settings and that indicates the type of wireless communication service. In order for the software wireless AP 8 to provide a wireless communication service using a specific wireless scheme, it is necessary for the software wireless AP 8 to perform various communication settings corresponding to the wireless communication scheme.

FIG. 2 is a diagram illustrating an example of various communication settings as components of a wireless scheme. As illustrated in FIG. 2, as setting items of various communication settings which are components of a wireless scheme, such as "primary modulation scheme", "secondary modulation scheme", "multiplexing scheme", and "interference control technology". Further, the setting contents of each setting item are as follows.

Examples of the first modulation scheme include the following schemes.
Amplitude shift keying (ASK) scheme
Frequency shift keying (FSK) scheme
Binary phase shift keying (BPSK) scheme
Quadrature phase shift keying (QPSK) scheme
Quadrature amplitude modulation (64QAM) scheme Examples of the secondary modulation scheme includes the following schemes.
Direct sequence (DS) scheme
Frequency hopping (FH) scheme
Orthogonal frequency division multiplexing (OFDM) scheme
Filter bank multi-carrier (FBMC) scheme
Universal filtered-multi-carrier (UFMC) scheme
Generalized frequency division multiplex (GFDM) scheme Examples of the multiplexing scheme include the following schemes.
Time division multiple access (TDMA) scheme
Frequency division multiple access (FDMA) scheme
Code division multiple access (CDMA) scheme
Non-orthogonal multiple access (NOMA)
Sparse-code multiple access (SCMA) scheme
Packet division multiple access (PDMA) scheme
Space division multiple access (SDMA) scheme Examples of the interference control technology include the following schemes.
Inter-cell interference coordination (ICIC) technology
Successive interference cancellation (SIC) technology
Interference rejection combining (IRC) technology
Coordinated multi-point (CoMP) technology
Beam forming technology
Maximum likelihood detection (MLD) technology The setting items and setting contents of various communication settings are not limited to the above contents.

The communication scheme enabled by the combination of the setting contents selected for each of the above setting items is the wireless scheme here. In the following description, a combination of setting contents in setting items of various communication settings may be referred to as a "setting pattern". For example, a combination of setting contents configured by selecting "ASK" as a primary modulation scheme, "DS" as a secondary modulation scheme, "TDMA" as a multiplexing scheme, and "ICIC" as an interference control technology is one setting pattern (for example, setting pattern A). For example, in the software wireless AP 8, a specific wireless communication service is provided by a wireless scheme enabled by the setting pattern (for example, the setting pattern A).

Returning to FIG. 1, the description will be continued. The AP integrated controller 7 includes a global wireless scheme storage 70 that stores a setting file (hereinafter, referred to as a "wireless scheme file") for implementing a wireless scheme based on each setting pattern in the software wireless AP 8.

Upon acquiring a request for providing a wireless communication service from an IoT service provider, the AP integrated controller 7 determines a setting pattern based on the received request. The AP integrated controller 7 extracts a wireless file describing the determined setting pattern from the global wireless scheme storage 70. The AP integrated controller 7 transmits the extracted wireless scheme file to the software wireless AP 8.

The software wireless AP 8 receives the wireless scheme file transmitted from the AP integrated controller 7. The software wireless AP 8 implements a device configuration for providing a wireless communication service according to a specific wireless scheme requested by the IoT service provider by using the received wireless scheme file, by a software wireless technology. Accordingly, the software wireless AP 8 can provide a wireless communication service by the specific wireless scheme to a wireless communication terminal (not illustrated).

Figure 3:
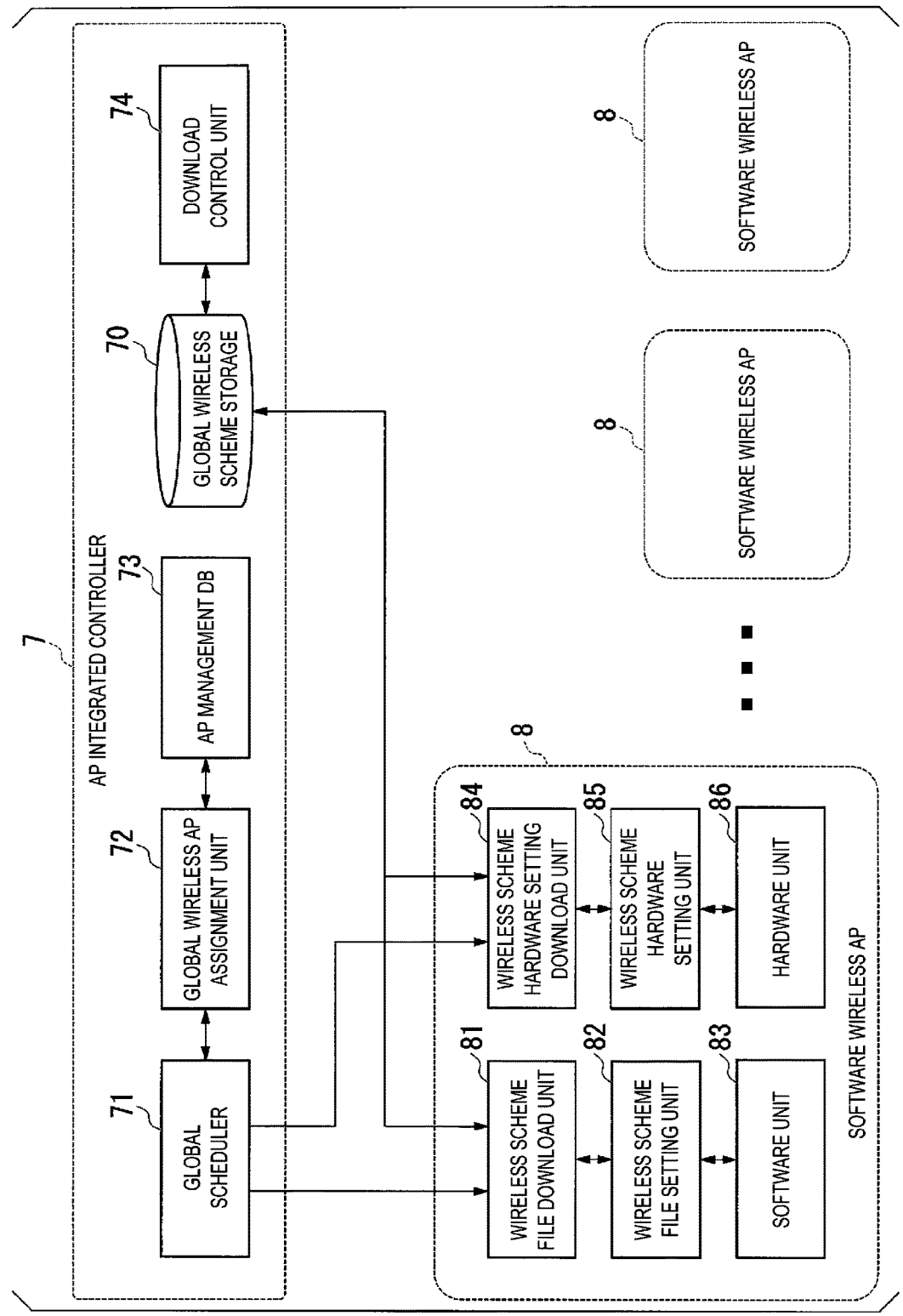
FIG. 3 is a block diagram illustrating a functional configuration of a communication control system of the related art.

FIG. 3 is a block diagram illustrating a functional configuration of a communication control system of the related art. As illustrated in FIG. 3, the communication control system of the related art includes the AP integrated controller 7 and the plurality of software wireless APs 8.

Further, the AP integrated controller 7 includes the global wireless scheme storage 70, a global scheduler 71, a global wireless AP assignment unit 72, an AP management DB 73, and a download control unit 74. The software wireless AP 8 includes a wireless scheme file download unit 81, a wireless scheme file setting unit 82, a software unit 83, a wireless scheme hardware setting download unit 84, a wireless scheme hardware setting unit 85, and a hardware unit 86.

The global wireless AP assignment unit 72 assigns a wireless scheme to the wireless scheme file download unit 81 and the wireless scheme hardware setting download unit 84 of the software wireless AP 8 based on the AP management information stored in the AP management DB 73, via the global scheduler 71. Here, a specific wireless scheme for enabling a wireless communication service requested by the IoT service provider is assigned.

When a wireless scheme is assigned by the global wireless AP assignment unit 72, the wireless scheme file download unit 81 downloads a wireless scheme file corresponding to the assigned wireless scheme from the global wireless scheme storage 70 of the AP integrated controller 7. The download of the wireless file from the global wireless scheme storage 70 to the wireless scheme file download unit 81 is controlled by the download control unit 74 of the AP integrated controller 7.

The wireless scheme file download unit 81 outputs the downloaded wireless scheme file to the wireless scheme file setting unit 82. When the wireless scheme file is input from the wireless scheme file download unit 81, the wireless scheme file setting unit 82 sets up the software unit 83 by using the input wireless scheme file.

Further, when a wireless scheme is assigned by the global wireless AP assignment unit 72, the wireless scheme hardware setting download unit 84 downloads wireless scheme hardware setting information corresponding to the assigned wireless scheme from the global wireless scheme storage 70. The download of the wireless hardware setting information from the global wireless scheme storage 70 to the wireless scheme hardware setting download unit 84 is controlled by the download control unit 74.

The wireless scheme hardware setting download unit 84 outputs the downloaded wireless scheme hardware setting information to the wireless scheme hardware setting unit 85. When the wireless scheme hardware setting information is input from the wireless scheme hardware setting download unit 84, the wireless scheme hardware setting unit 85 sets up the hardware unit 86 by using the input wireless scheme hardware setting information.

Accordingly, the software wireless AP 8 can provide a wireless communication service by a specific wireless scheme requested by the IoT service provider to a wireless communication terminal (not illustrated).

However, as described above, when enabling a communication scheme that determines and communicates wireless schemes accordingly, each of the software wireless APs 8 needs to acquire each wireless scheme file for implementing the determined wireless scheme at each time. When attempting to enable such a communication system by using the above-described communication control system of the related art, the download of the wireless scheme file by the software wireless AP 8 frequently occurs, and thus the system load and the network load on the AP integrated controller 7 increase. Accordingly, it is expected to take a long time for the software wireless AP 8 to complete the implementation of the wireless scheme.

Further, as described above, a configuration in which the wireless system file is stored in advance in the software wireless AP 8 side is required to store in advance all wireless scheme files corresponding to the wireless scheme that can be determined. In this case, it is difficult to secure the storage capacity of the wireless scheme file in each software wireless AP 8 and to update the wireless scheme file stored in each software wireless AP 8 side.

Figure 4:
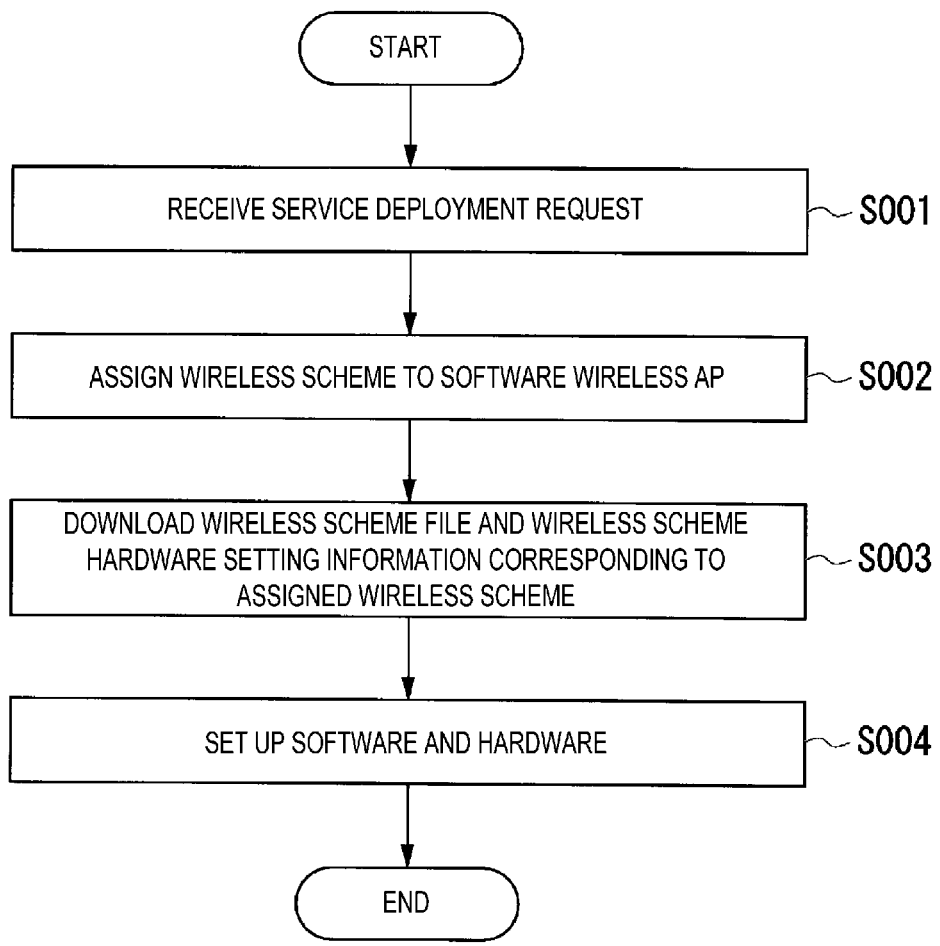
FIG. 4 is a flowchart illustrating a flow of processing by the communication control system of the related art.

FIG. 4 is a flowchart illustrating a flow of processing by the communication control system of the related art.

The global wireless AP assignment unit 72 of the AP integrated controller 7 acquires information indicating a service deployment request from the IoT service provider (step S001). Upon acquiring information indicating a service deployment request, the global wireless AP assignment unit 72 assigns a specific wireless scheme for enabling the service deployment request to the wireless scheme file download unit 81 and the wireless scheme hardware setting download unit 84 of the software wireless AP 8 (step S002).

When a wireless scheme is assigned, the wireless scheme file download unit 81 downloads a wireless scheme file corresponding to the assigned wireless scheme from the global wireless scheme storage 70 of the AP integrated controller 7. Also, when a wireless scheme is assigned, the wireless scheme hardware setting download unit 84 downloads wireless scheme hardware setting information corresponding to the assigned wireless scheme from the global wireless scheme storage 70 (step S003).

The wireless scheme file setting unit 82 sets up the software unit 83 by using the wireless scheme file downloaded by the wireless scheme file download unit 81. In addition, the wireless scheme hardware setting unit 85 sets up the hardware unit 86 by using the wireless scheme hardware setting information downloaded by the wireless scheme hardware setting download unit 84 (step S004).

Thus, the processing illustrated in the flowchart of FIG. 4 ends.

Hereinafter, the communication control system Sa according to the first embodiment of the present invention will be described with reference to drawings.

Overview of Communication Control by Communication Control System

Figure 5:
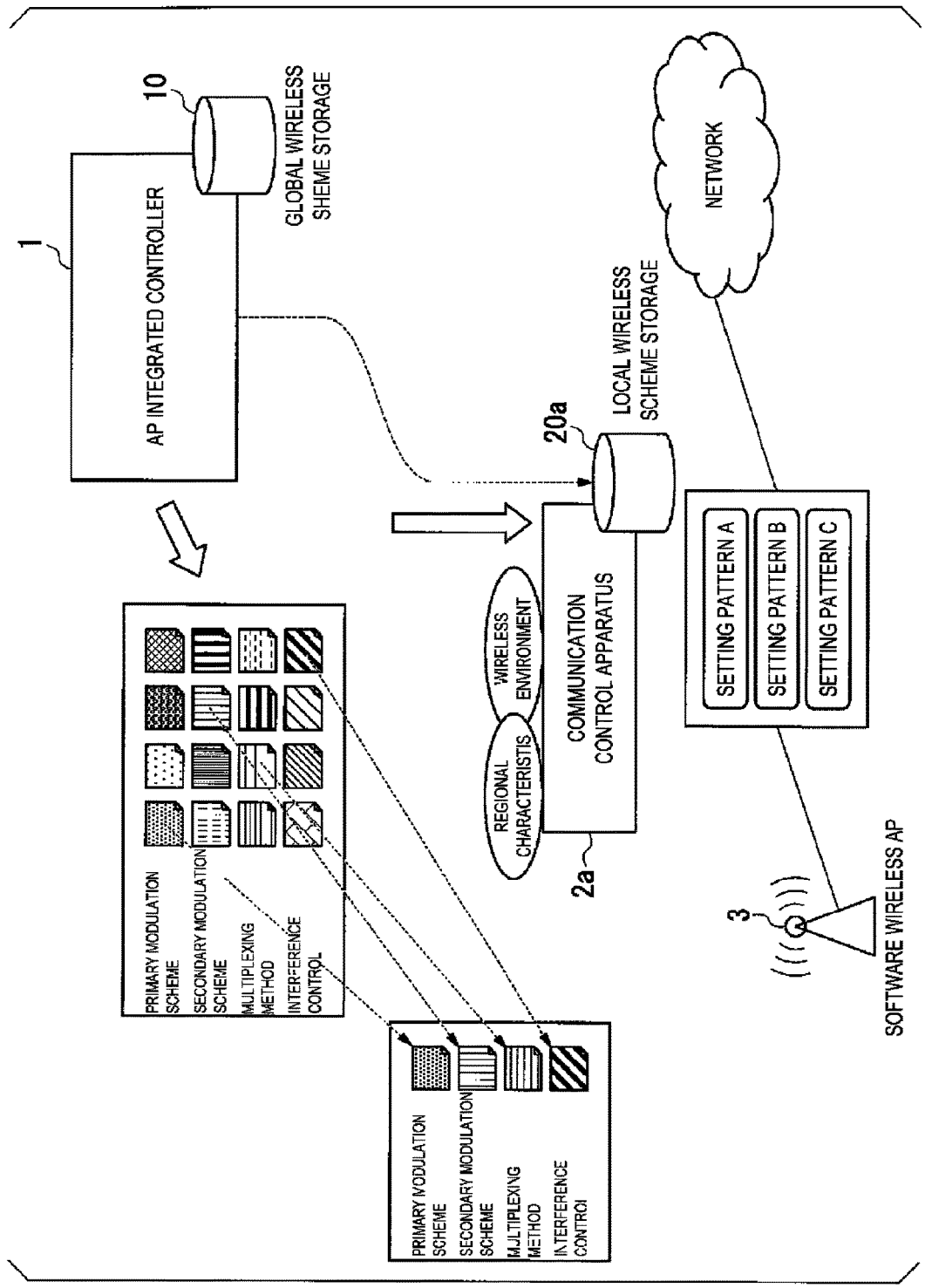
FIG. 5 is a schematic diagram illustrating an example of communication control by a communication control system according to a first embodiment.

FIG. 5 is a schematic diagram illustrating an example of communication control by the communication control system Sa according to the first embodiment. As illustrated in FIG. 5, the communication control system Sa includes an AP integrated controller 1 (management apparatus), a communication control apparatus 2*a* (communication control device), and a software wireless AP 3 (communication apparatus).

The AP integrated controller 1 and the software wireless AP 3 are communicably connected via the communication control apparatus 2*a*. The AP integrated controller 1 is communicably connected to each of a plurality of communication control apparatuses 2*a*, but for simplicity of description, FIG. 5 illustrates only one communication control apparatus 2*a* and one software radio AP 3 that controls the communication control apparatus 2*a*.

The software wireless AP 3 can implement a specific wireless scheme from among various types of wireless schemes by software wireless technology and provide a wireless communication service to a wireless communication terminal (not illustrated). The software wireless AP 3 is used, for example, in common by a plurality of IoT service providers, appropriately determines a wireless scheme according to a request for providing a wireless communication service from each IoT service provider, and provides a wireless communication service according to the determined wireless scheme.

The AP integrated controller 1 includes a global wireless scheme storage 10 that stores a wireless scheme file for implementing the wireless scheme based on each setting pattern in the software wireless AP 3.

The AP integrated controller 1 acquires, from the communication control apparatus 2a, information indicating regional characteristics indicating a communication environment and a wireless environment in a region where the software wireless AP 3 to be controlled is installed in advance (for example, periodically). The AP integrated controller 1 rearranges a plurality of wireless system files stored in the global wireless scheme storage 10 based on the acquired information indicating the regional characteristics and the wireless environment. The AP integrated controller 1 extracts the top N wireless scheme files from among the rearranged wireless system files. The AP integrated controller 1 transmits the extracted upper N wireless scheme files to the communication control apparatus 2a.

The communication control apparatus 2a acquires the top N wireless scheme files transmitted from the AP integrated controller 1. The communication control apparatus 2a includes a local wireless scheme storage 20a that stores the acquired upper N wireless scheme files. The communication control apparatus 2a stores the acquired upper N wireless scheme files in the local wireless scheme storage 20a.

Upon receiving a request for providing a wireless communication service from the IoT service provider, the AP integrated controller 1 transmits the received request to the communication control apparatus 2a. The communication control apparatus 2a receives the request for providing a wireless communication service from the IoT service provider, transmitted from the AP integrated controller 1. The communication control apparatus 2a determines a setting pattern based on the received request. The AP integrated controller 1 extracts a wireless scheme file describing the determined setting pattern from the local wireless scheme storage 20a. The communication control apparatus 2a transmits the extracted wireless scheme file to the software wireless AP 3.

The software wireless AP 3 receives the wireless scheme file transmitted from the communication control apparatus 2a. The software wireless AP 3 implements a device configuration for providing a wireless communication service according to a specific wireless scheme requested by the IoT service provider by using the received wireless scheme file, by a software wireless technology. Accordingly, the software wireless AP 3 can provide a wireless communication service by the specific wireless scheme to a wireless communication terminal (not illustrated).

When a request for providing a wireless communication service from the IoT operator is received, the communication control apparatus 2a may measure the communication status (for example, radio wave propagation status) of the software wireless AP 3 to be controlled. In this case, the communication control apparatus 2a determines a setting pattern based on the measured communication status and a request for providing a wireless communication service from the IoT operator.

It is preferable that each communication control apparatus 2a is installed near the software wireless AP 3 to be controlled by each communication control apparatus 2, respectively. This is because it is possible to expect a reduction in communication cost associated with downloading a wireless scheme file from the communication control apparatus 2a to the software wireless AP 3, and an improvement in measurement accuracy of a communication status by installing the communication control apparatus 2a near the software wireless AP 3. However, the installation location of the communication control apparatus 2a is not limited to the vicinity of the software wireless AP 3.

Functional Configuration of Communication Control System

Hereinafter, the functional configuration of the communication control system Sa will be described with reference to drawings.

Figure 6:
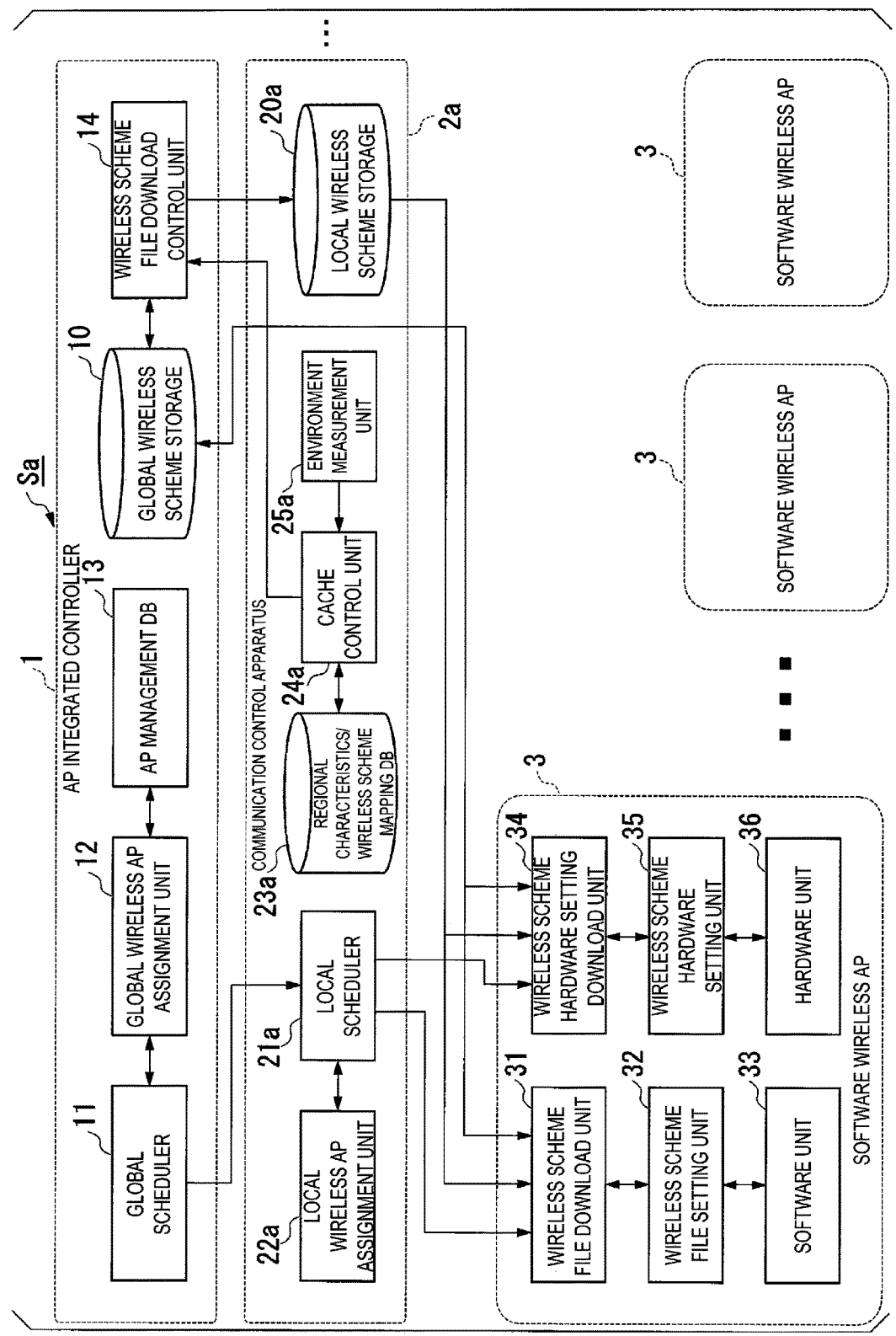
FIG. 6 is a block diagram illustrating a functional configuration of the communication control system according to the first embodiment.

FIG. 6 is a block diagram illustrating a functional configuration of the communication control system Sa according to the first embodiment. As illustrated in FIG. 6, the communication control system Sa includes an AP integrated controller 1, a plurality of communication control apparatuses 2a, and a plurality of software wireless APs 3 to be controlled by each communication control apparatus 2a.

The AP integrated controller 1 includes a global wireless scheme storage 10, a global scheduler 11, a global wireless AP assignment unit 12, an AP management DB 13, and a wireless scheme file download control unit 14.

The communication control apparatus 2a includes a local wireless scheme storage 20a, a local scheduler 21a, a local wireless AP assignment unit 22a, a regional characteristics/wireless scheme mapping DB 23a, a cache control unit 24a, and an environment measurement unit 25a.

The software wireless AP 3 includes a wireless scheme file download unit 31, a wireless scheme file setting unit 32, a software unit 33, a wireless scheme hardware setting download unit 34, a wireless scheme hardware setting unit 35, and a hardware unit 36.

The wireless scheme file download control unit 14 acquires in advance (for example, periodically), information indicating regional characteristics indicating a communication environment and a wireless environment (communication parameter) in a region where the software wireless AP 3 to be controlled is installed, from the regional characteristics/wireless scheme mapping DB 23a (regional characteristic communication parameter correspondence information storage unit) via the cache control unit 24a (setting file acquisition control unit) of the communication control apparatus 2a.

The wireless scheme file download control unit 14 sorts the plurality of wireless scheme files stored in the global wireless scheme storage 10 based on the acquired information indicating the regional characteristics and the wireless environment. The wireless scheme system file download control unit 14 extracts the top N wireless system files from the rearranged wireless scheme system files. The wireless scheme file download control unit 14 transmits the extracted upper N wireless scheme file to the communication control apparatus 2a.

The communication control apparatus 2a acquires the upper N wireless scheme files (setting files) transmitted from the AP integrated controller 1. The communication control apparatus 2a stores the acquired upper N wireless scheme files in the local wireless scheme storage 20a (setting files storage unit).

Upon receiving a request for providing a wireless communication service from the IoT operator, the global wireless AP assignment unit 12 transmits the received request to the local scheduler 21a of the communication control apparatus 2a via the global scheduler 11, based on the AP management information stored in the AP management DB 13. The local scheduler 21a receives the request for providing a wireless communication service from the IoT operator, transmitted from the AP integrated controller 1. When the local scheduler 21a receives the request for providing a wireless communication service from the IoT operator, the local wireless AP assignment unit 22a determines a setting pattern based on the received request.

The local wireless AP assignment unit 22a (communication parameter assignment unit) assigns the wireless scheme (first communication parameter) corresponding to the wireless scheme file in which the determined setting pattern is described, from the local wireless scheme storage 20a to the wireless scheme file download unit 31 and the wireless scheme hardware setting download unit 34 of the software wireless AP 3 via the local scheduler 21a.

When a wireless scheme is assigned by the local wireless AP assignment unit 22a, the wireless scheme file download unit 31 downloads a wireless scheme file corresponding to the assigned wireless scheme from the local wireless scheme storage 20a of the communication control apparatus 2a.

The wireless scheme file download unit 31 outputs the downloaded wireless scheme file to the wireless scheme file setting unit 32. When the wireless scheme file is input from the wireless scheme file download unit 31, the wireless scheme file setting unit 32 sets up the software unit 33 by using the input wireless scheme file.

Further, when a wireless scheme is assigned by the global wireless AP assignment unit 22a, the wireless scheme hardware setting download unit 34 downloads wireless scheme hardware setting information corresponding to the assigned wireless scheme from the global wireless scheme storage 20a.

The wireless scheme hardware setting download unit 34 outputs the downloaded wireless scheme hardware setting information to the wireless scheme hardware setting unit 35. When the wireless scheme hardware setting information is input from the wireless scheme hardware setting download unit 34, the wireless scheme hardware setting unit 35 sets up the hardware unit 36 by using the input wireless scheme hardware setting information.

Accordingly, the software wireless AP 3 can provide a wireless communication service by a specific wireless scheme requested by the IoT operator to a wireless communication terminal (not illustrated).

When a request for providing a wireless communication service from the IoT operator is received, the communication control apparatus 2a may measure the communication status (for example, radio wave propagation status) of the software wireless AP 3 to be controlled. In this case, the cache control unit 24a of the communication control apparatus 2a causes the environment measurement unit 25a (communication state measurement unit) to measure the communication status of the software wireless AP 3 to be controlled. Then, when the local scheduler 21a receives a request for providing a wireless communication service from the IoT operator, the local wireless AP assignment unit 22a determines a setting pattern based on the received request and information (communication state information) indicating the communication status measured by the environment measurement unit 25a.

In the first embodiment, each communication control apparatus 2a has the configuration including the environment measurement unit 25a, but the configuration is not limited to this configuration. The environment measurement unit 25a may be configured to be provided in, for example, each software wireless AP 3 or another apparatus installed near each software wireless AP 3.

Operation of Communication Control Apparatus (Communication Control Device)

Hereinafter, the flow of processing by the communication control apparatus 2a will be described with reference to drawings. Unlike the processing by the communication control system of the related art, described with reference to FIG. 4, the processing by the communication control apparatus 2a according to the first embodiment is divided into two types of processing. The two types of processing are pre-processing in which a plurality of wireless scheme files are downloaded from the AP integrated controller 1 to the communication control apparatus 2a (hereinafter, referred to as "pre-processing") and processing in which a specific wireless scheme is assigned to a software wireless AP based on a request from the IoT service provider (hereinafter, referred to as "communication start processing").

Figure 7:
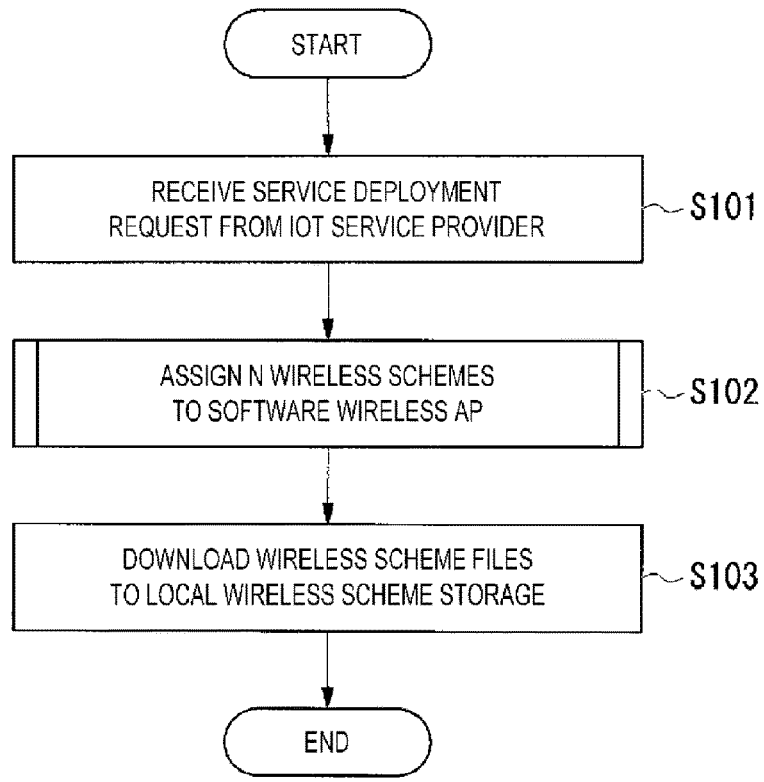
FIG. 7 is a flowchart illustrating a flow of pre-processing by the communication control system according to the first embodiment.
Figure 8:
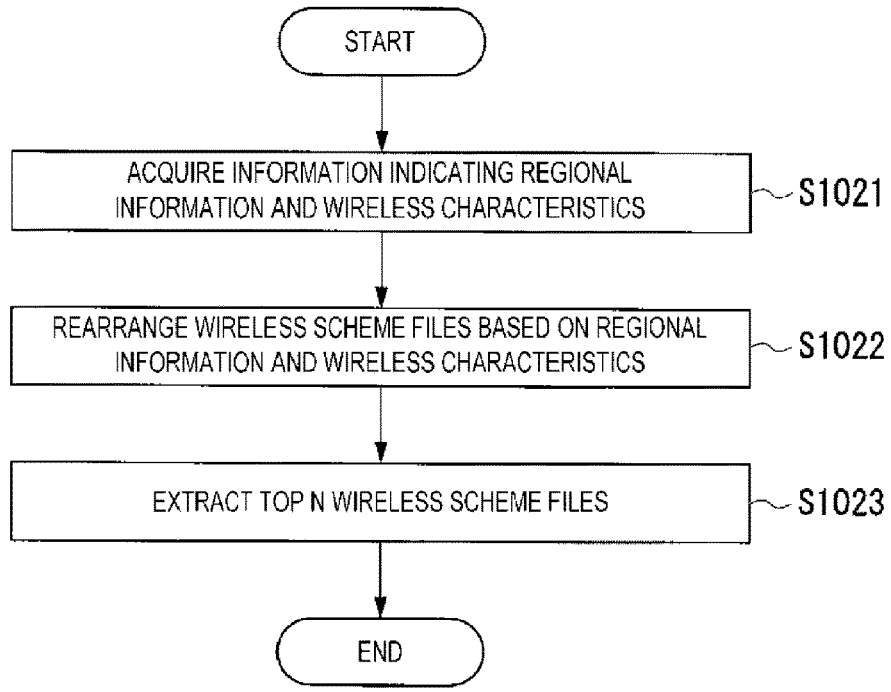
FIG. 8 is a flowchart illustrating the flow of pre-processing by the communication control system according to the first embodiment.

FIG. 7 and FIG. 8 are flowcharts illustrating the flow of the pre-processing by the communication control system Sa according to the first embodiment of the present invention. First, a description will be given with reference to FIG. 7.

The global wireless AP assignment unit 12 receives a service deployment request from the IoT service provider (step S101). The global wireless AP assignment unit 12 assigns N wireless schemes (second communication parameters) to the software wireless AP 3 based on the received request (step S102). The N wireless systems (second communication parameters) assigned here are wireless schemes that are candidates for a wireless scheme (first communication parameter) to be assigned to the software AP 3 (communication apparatus).

When the local scheduler 21a (communication parameter acquisition unit) of the communication control apparatus 2a acquires N wireless schemes (second communication parameters) assigned to the software wireless AP 3, the local wireless AP assignment unit 22a downloads wireless scheme files (setting files) corresponding to the assigned N wireless schemes and stores the files in the local wireless scheme storage 20a (step S103).

Thus, the processing illustrated in the flowchart of FIG. 7 ends.

The flowchart illustrated in FIG. 8 illustrates the processing of step S102 in the flowchart illustrated in FIG. 7 in more detail.

First, the global wireless AP assignment unit 12 acquires, from the communication control apparatus 2a, information indicating regional characteristics and information indicating a wireless environment corresponding to the software wireless AP 3 to be controlled (step S1021). The global wireless AP assignment unit 12 rearranges the plurality of wireless scheme files stored in the global wireless scheme storage 10 based on the acquired information indicating the regional characteristics and the information indicating the wireless environment (step S1022). The AP integrated controller 1 extracts the top N wireless scheme files from among the rearranged wireless system files (step S1023).

Thus, the processing illustrated in the flowchart of FIG. 8 ends.

Figure 9:
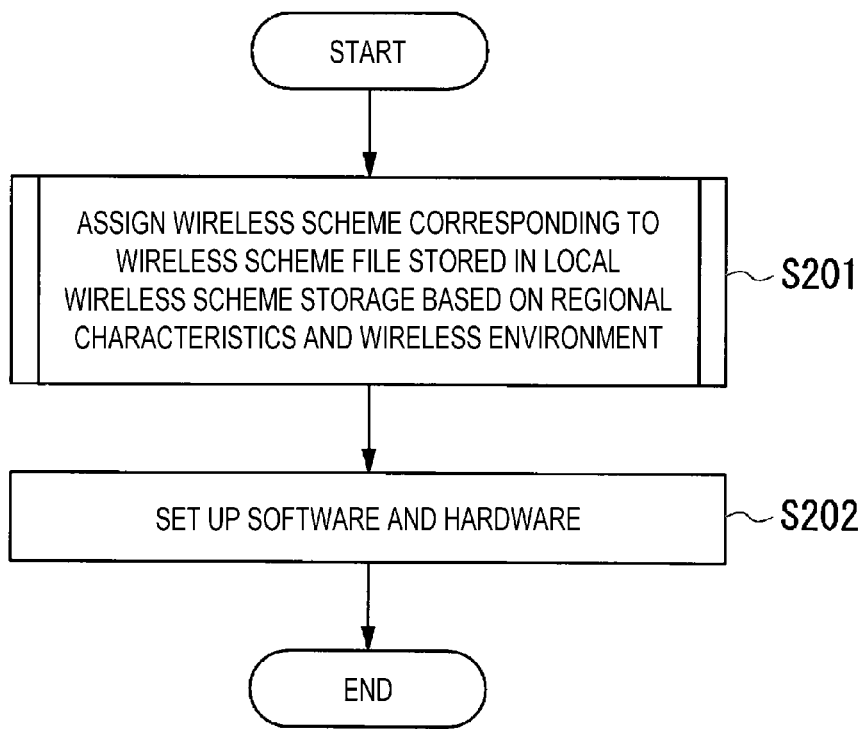
FIG. 9 is a flowchart illustrating a flow of communication start processing performed by the communication control system according to the first embodiment.
Figure 10:
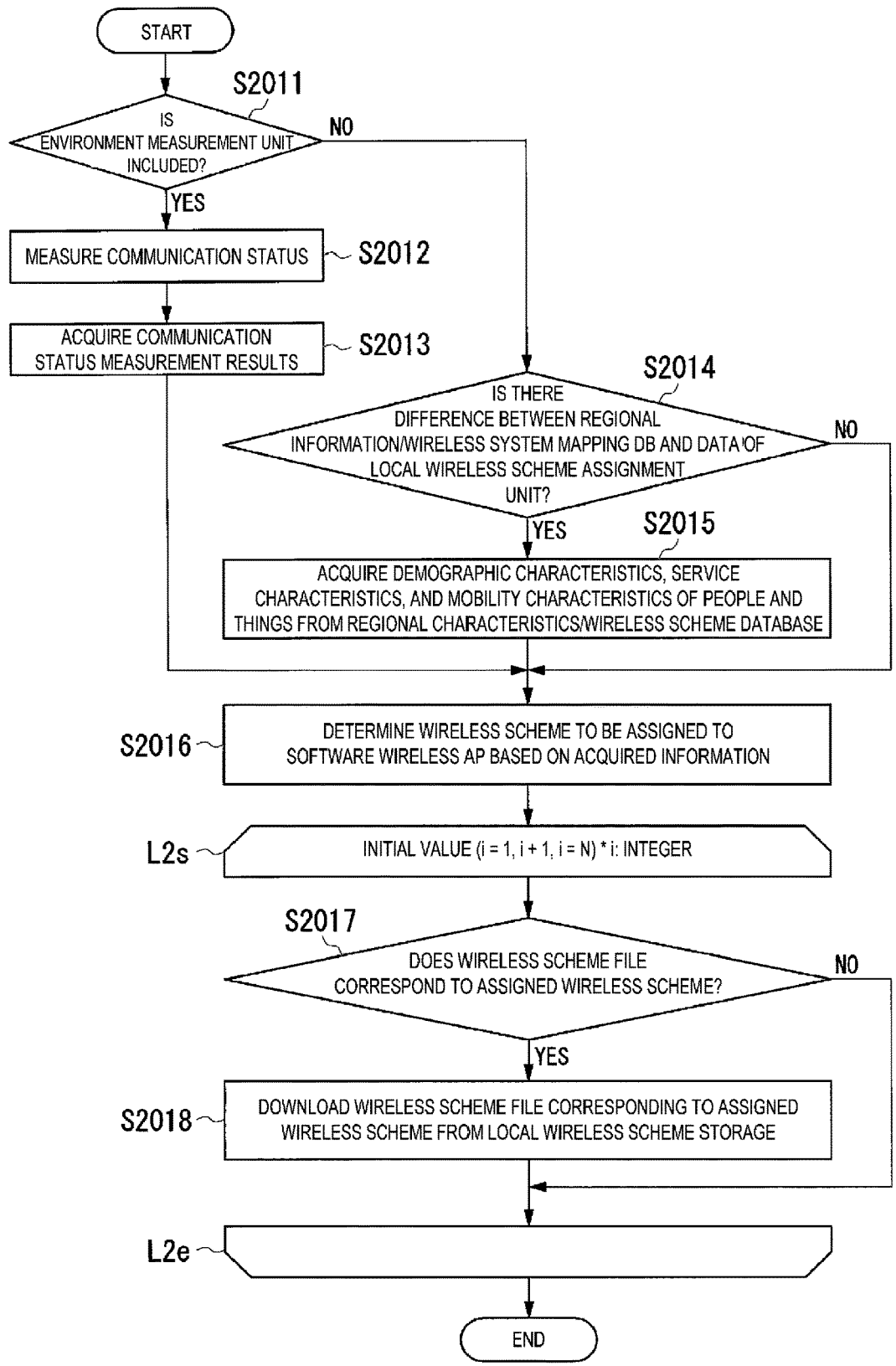
FIG. 10 is a flowchart illustrating the flow of communication start processing by the communication control system according to the first embodiment.

FIG. 9 and FIG. 10 are flowcharts illustrating the flow of communication start processing by the communication control system Sa according to the first embodiment of the present invention. First, a description will be given with reference to FIG. 9.

The local wireless AP assignment unit 22a determines a specific wireless scheme to be assigned to the software wireless AP 3 to be controlled based on the information indicating the regional characteristics and the information indicating the wireless environment, from a plurality of wireless schemes (second communication parameters) respectively corresponding to the plurality of wireless scheme files stored in the local wireless scheme storage 20a. The local wireless AP assignment unit 22a assigns the determined wireless scheme (first communication parameter) to the controlled software wireless AP 3 (communication apparatus) (step S201).

When the wireless scheme is assigned, the wireless scheme file download unit 31 downloads a wireless scheme file corresponding to the assigned wireless scheme from the local wireless scheme storage 20. Also, when a wireless scheme is assigned, the wireless scheme hardware setting download unit 34 downloads wireless scheme hardware setting information corresponding to the assigned wireless scheme from the global wireless scheme storage 30. The wireless scheme file setting unit 32 sets up the software unit 33 by using the wireless scheme file downloaded by the wireless scheme file download unit 31. In addition, the wireless scheme hardware setting unit 35 sets up the hardware unit 36 by using the wireless scheme hardware setting information downloaded by the wireless scheme hardware setting download unit 34 (step S202).

Thus, the processing illustrated in the flowchart of FIG. 9 ends.

The flowchart illustrated in FIG. 10 illustrates the processing of step S201 in the flowchart illustrated in FIG. 9 in more detail.

First, when the communication control apparatus 2a includes the environment measurement unit 25a (Yes in step S2011), the environment measurement unit 25a measures the communication status (for example, radio wave propagation status) (step S2012) and generates information (communication status information) indicating the measurement result, and the local wireless AP assignment unit 22a acquires information (communication state information) indicating the measurement result of the communication status (step S2013). In this case, the environment measurement unit 25a may predict a future communication status from a past communication status and output the predicted value to the local wireless AP assignment unit 22a.

When the communication control apparatus 2a does not include the environment measurement unit 25a (No in step S2011), and there is a difference between the information stored in the regional characteristics/wireless scheme mapping DB 23a and the information acquired by the local wireless AP assignment unit 22a (YES in step S2014), the local wireless AP assignment unit 22a acquires the demographic characteristics, the service characteristics, and the mobility characteristics of the people and things from the regional characteristics/wireless scheme mapping DB 23a (step S2015).

The local wireless AP assignment unit 22a determines a wireless scheme to be assigned to the software wireless AP 3 to be controlled based on the acquired information (for example, information indicating the measurement result of the communication status measured by the environment measurement unit 25a, and information acquired from the regional characteristics/wireless scheme mapping DB 23a) (step S2016).

Next, the processing from L2s to L2e in FIG. 10 is repeatedly executed the number of times (N times) corresponding to the N wireless scheme files stored in the local wireless scheme storage 20a.

The wireless scheme file download unit 31 confirms the wireless scheme file stored in the local wireless scheme storage 20a and downloads the wireless scheme file from the local wireless scheme storage 20a if the confirmed wireless scheme file is a wireless scheme file corresponding to the assigned wireless scheme (YES in step S2017) (step S2018).

Thus, the processing illustrated in the flowchart of FIG. 10 ends.

Figure 11:
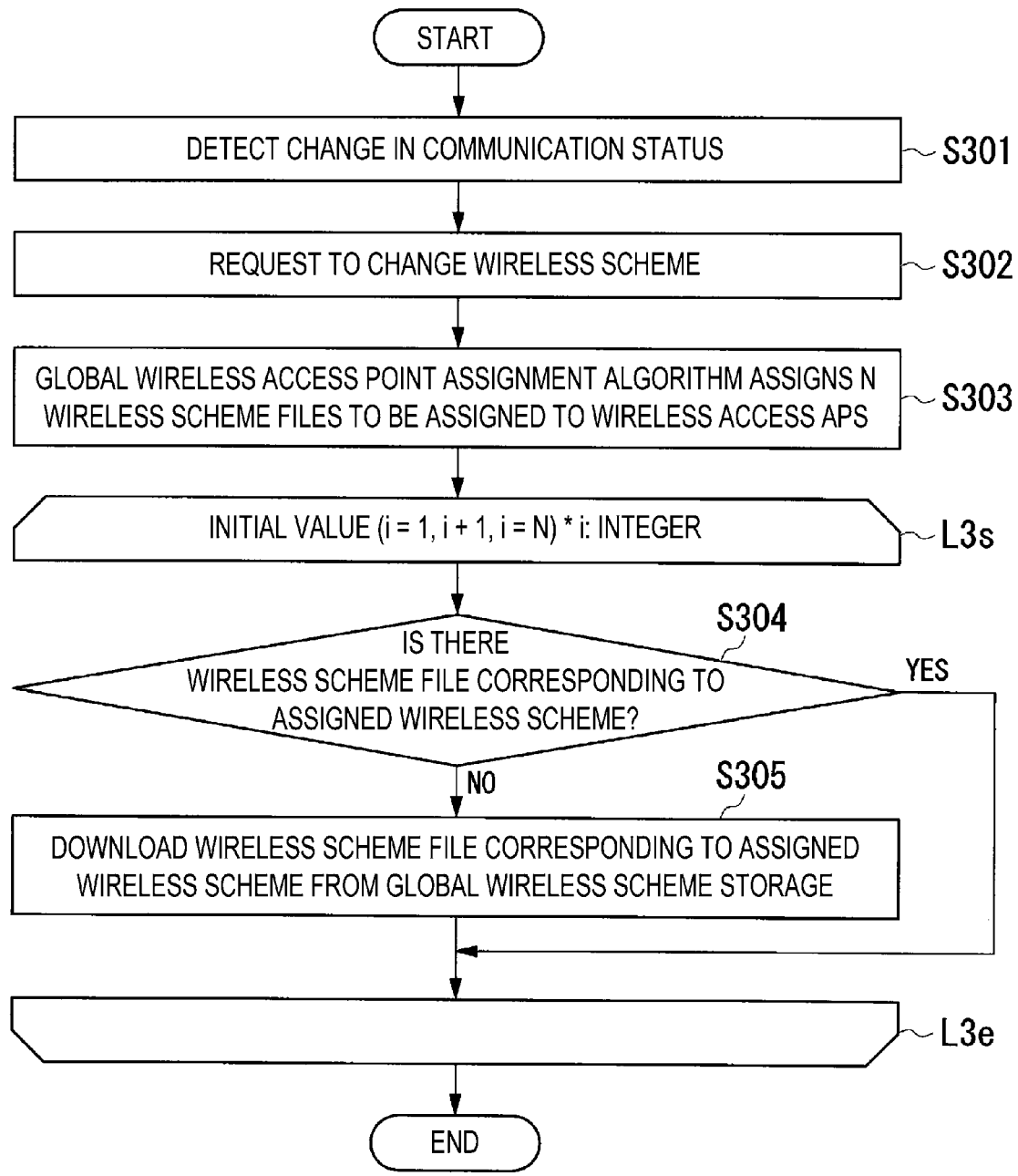
FIG. 11 is a flowchart illustrating a flow of processing of changing global wireless scheme assignment based on a communication status by the communication control system according to the first embodiment.

FIG. 11 is a flowchart illustrating a flow of processing of changing global wireless scheme assignment based on a communication status by the communication control system Sa according to the first embodiment. The flowchart of FIG. 11 illustrates a flow of processing when a communication status (for example, a radio wave propagation status) measured by the environment measurement unit 25a changes.

First, the environment measurement unit 25a detects a change in the communication status (step S301). The local scheduler 21a requests the global wireless AP assignment unit 12 to change the wireless scheme (step S302). The global wireless AP assignment unit 12 assigns N wireless scheme files to be assigned to the software wireless AP 3 (step S303).

Next, the processing from L3s to L3e in FIG. 11 is repeatedly executed the number of times (N times) corresponding to the assigned N wireless scheme files.

The wireless scheme file download unit 31 confirms whether a wireless scheme file corresponding to the assigned wireless scheme exists in the local wireless scheme storage 20a. If the wireless scheme file corresponding to the assigned wireless scheme does not exist in the local wireless scheme storage 20a (No in step S304), the cache control unit 24a downloads the wireless scheme file from the global wireless scheme storage 10 (step S305).

Thus, the processing illustrated in the flowchart of FIG. 11 ends.

With the above configuration, the wireless scheme file stored in the local wireless scheme storage 20a is updated. When a wireless scheme file other than the wireless scheme file corresponding to the assigned wireless scheme exists in the local wireless scheme storage 20a, the cache control unit 24a may delete the wireless scheme file (wireless scheme file other than the wireless scheme file corresponding to the assigned wireless scheme) from the local wireless scheme storage 20a.

Figure 12:
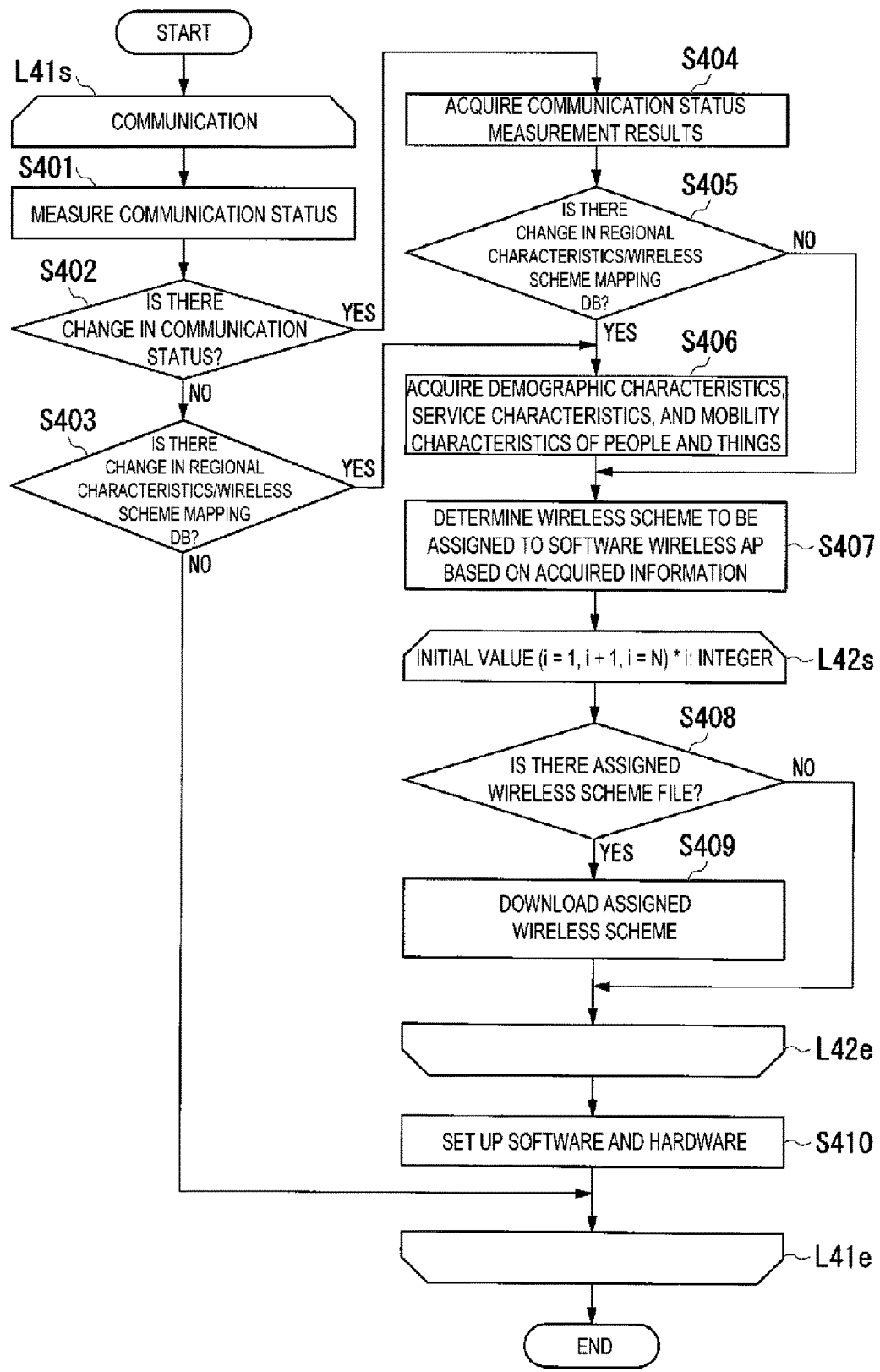

FIG. 12 is a flowchart illustrating a flow of processing of changing wireless scheme assignment by the communication control system Sa according to the first embodiment of the present invention based on a communication status, regional characteristics, a wireless environment, and the like. The flowchart of FIG. 12 illustrates a flow of processing in a case where there is a change in the communication status (for example, radio wave propagation status) or the regional characteristics and wireless environment in a state where the communication in the wireless communication service provided by the software wireless AP 3 is continued.

While the communication in the wireless communication service provided by the software wireless AP 3 is in a state of being continued, the processing from L41s to L41e in FIG. 12 are repeatedly executed.

The environment measurement unit 25a measures a communication status (for example, a radio wave propagation status) (step S401).

When there is a change in the communication status, the local wireless AP assignment unit 22a acquires the measurement result of the communication status (step S404). Here, when there is a change in the regional characteristics/wireless scheme mapping DB 23a (YES in step S405), the local wireless AP assignment unit 22a acquires information indicating the demographic characteristics, the service characteristics, and the mobility characteristics of people and things from the regional characteristics/wireless scheme mapping DB 23a (step S406).

The local wireless AP assignment unit 22a determines a wireless scheme to be assigned to the software wireless AP 3 based on the acquired information (step S407).

When there is no change in the communication status, and there is a change in the regional characteristics/wireless scheme mapping DB 23a (YES in step S403), the local wireless AP assignment unit 22a acquires information indicating the demographic characteristics, the service characteristics, and the mobility characteristics of people and things from the regional characteristics/wireless scheme mapping DB 23a (step S406). The local wireless AP assignment unit 22a determines a wireless scheme to be assigned to the software wireless AP 3 based on the acquired information (step S407).

Next, the processing from L42s to L42e in FIG. 12 is repeatedly executed the number of times (N times) corresponding to the N wireless scheme files stored in the local wireless scheme storage 20a.

The wireless scheme file download unit 31 confirms the wireless scheme file stored in the local wireless scheme storage 20a and downloads the wireless scheme file from the local wireless scheme storage 20a if the confirmed wireless scheme file is a wireless scheme file corresponding to the assigned wireless scheme (YES in step S408) (step S409).

The wireless scheme file setting unit 32 sets up the software unit 33 by using the wireless scheme file downloaded by the wireless scheme file download unit 31. Similarly, the wireless scheme hardware setting unit 35 sets up the hardware unit 36 by using the wireless scheme hardware setting information downloaded by the wireless scheme hardware setting download unit 34 (step S410).

Thus, the processing illustrated in the flowchart of FIG. 12 ends.

Configuration of Setting Pattern of Wireless Scheme

Hereinafter, a configuration of the setting pattern of a wireless scheme will be described with reference to drawings.

FIG. 13 is a diagram illustrating an example of a configuration of the setting pattern of a wireless scheme used by the communication control system Sa according to the first embodiment of the present invention.

As illustrated in FIG. 13, each setting pattern is information configured by a combination of setting contents in the setting items of various communication settings illustrated in FIG. 2. For example, the "setting pattern A" is information configured by selecting "ASK" as a primary modulation scheme, "DS" as a secondary modulation scheme, "TDMA" as a multiplexing scheme, and "ICIC" as an interference control technology.

FIG. 14 is a diagram illustrating an example of suitability between regional characteristics and setting patterns. In FIG. 14, a circle indicates that a setting pattern is suitable for regional characteristics, and a circle indicates that the setting pattern is not suitable for the regional characteristics.

For example, in the "setting pattern A", "mobility characteristics" is a triangle, "delay request" is a circle, "communication capacity" is a triangle, "peak data amount" is a triangle, and the number of devices is a triangle. This indicates that the wireless scheme based on "setting pattern A" has the following suitability for each of the following regions.

Low suitability for a region where many wireless communication terminals have a long moving distance.

High suitability for regions where communication delay requirements are high.

Low suitability for regions where large communication capacity is required.

Low suitability for regions with large peak data amount of communications.

Low suitability for regions with many devices (wireless communication terminals).

FIG. 15 is a diagram illustrating an example of a table that defines setting patterns assigned to regional characteristics. For example, a table as illustrated in FIG. 15 is created in advance based on the suitability between the regional characteristics and the setting patterns as illustrated in FIG. 14. The local wireless AP assignment unit 22a assigns a wireless scheme based on the acquired information indicating the regional characteristics and a table created in advance as illustrated in FIG. 15.

For example, as illustrated in FIG. 15, a wireless scheme based on the setting pattern A is assigned to the software wireless AP 3 installed in a region having regional characteristics such as "mobility characteristics" being high speed (that is, a region where many wireless communication terminals move at high speeds), "delay requirement" being high, "communication capacity" being moderate (and bidirectional communication required), "peak data amount" being small, a small number of devices (the number of wireless communication terminals), and the like.

Second Embodiment

Hereinafter, a second embodiment of the present invention will be described with reference to drawings.

Functional Configuration of Communication Control System

Hereinafter, the functional configuration of a communication control system Sb will be described with reference to drawings.

Figure 16:
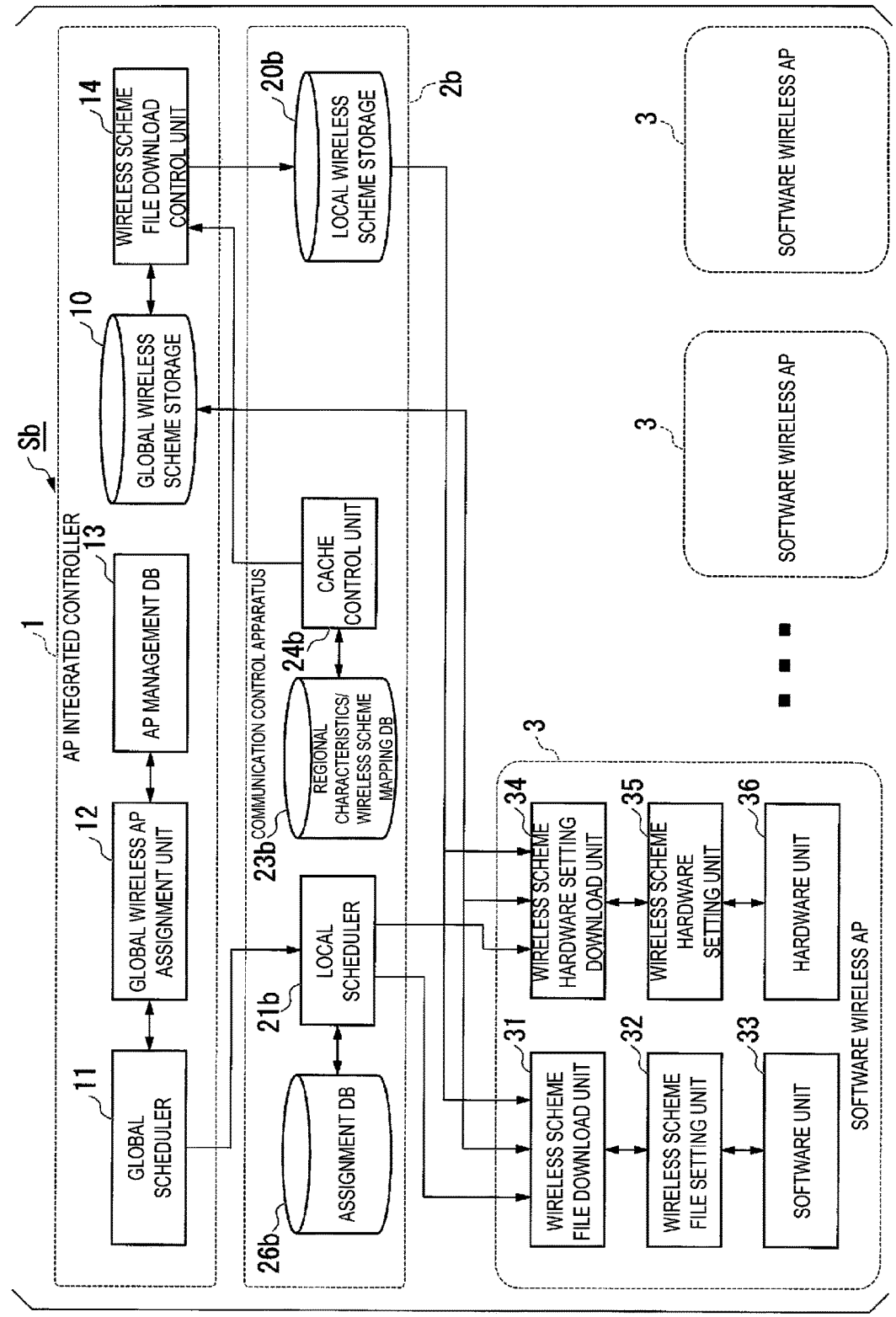
FIG. 16 is a block diagram illustrating a functional configuration of a communication control system according to a second embodiment.

FIG. 16 is a block diagram illustrating a functional configuration of the communication control system Sb according to the second embodiment of the present invention. As illustrated in FIG. 16, the communication control system Sb includes an AP integrated controller 1, a plurality of communication control apparatuses 2b (communication control device), and a plurality of software wireless APs 3 to be controlled by each communication control apparatus 2b.

The AP integrated controller 1 includes a global wireless scheme storage 10, a global scheduler 11, a global wireless AP assignment unit 12, an AP management DB 13, and a wireless scheme file download control unit 14.

Further, the communication control apparatus 2b includes a local wireless scheme storage 20b, a local scheduler 21b, a regional characteristics/wireless scheme mapping DB 23b, a cache control unit 24b, and an assignment DB 26b.

The software wireless AP 3 includes a wireless scheme file download unit 31, a wireless scheme file setting unit 32, a software unit 33, a wireless scheme hardware setting download unit 34, a wireless scheme hardware setting unit 35, and a hardware unit 36.

The communication control system Sb according to the second embodiment differs from the communication control system Sa according to the first embodiment in that the communication control system Sb includes the communication control apparatus 2b instead of the communication control apparatus 2a.

The difference between the communication control apparatus 2b and the communication control apparatus 2a is that the communication control apparatus 2b does not include the local wireless AP assignment unit 22a and the environment measurement unit 25a, but includes an assignment DB 26b.

The assignment DB 26b stores assignment information indicating the wireless scheme assigned by the global wireless AP assignment unit 12. A configuration in which the time of assigning the wireless scheme is stored in the assignment DB 26b, and information indicating a previously assigned wireless scheme is referred to or information indicating an old wireless scheme is deleted, may be employed. In addition, for maintenance of a wireless communication terminal (not illustrated), a configuration in which the software wireless AP 3 is periodically set based on the wireless scheme stored in the assignment DB 26b may be employed.

Configuration of Assignment Information

Figures 17, 18:
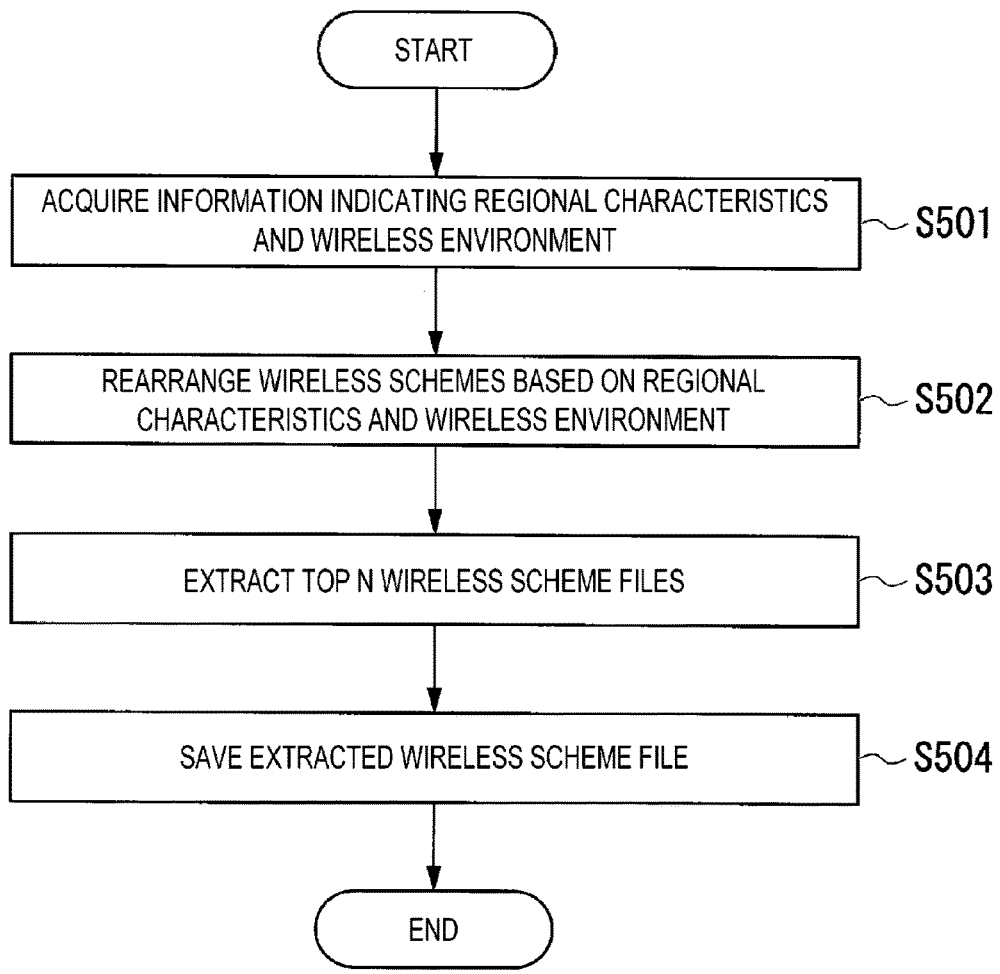
FIG. 17 is a diagram illustrating an example of assignment information stored in an assignment database (DB) of the communication control system according to the second embodiment.
FIG. 18 is a flowchart illustrating a flow of pre-processing by the communication control system according to the second embodiment.

FIG. 17 is a diagram illustrating an example of assignment information stored in the assignment DB 26b of the communication control system Sb according to the second embodiment of the present invention. As illustrated in FIG. 17, the assignment information is information in which a setting pattern based on a wireless scheme assigned in the past and a number are associated with each other.

Operation of Communication Control Apparatus
(Communication Control Device)

Hereinafter, the flow of processing by the communication control apparatus 2b will be described with reference to drawings. As is the case with the processing by the communication control apparatus 2a according to the first embodiment, the processing by the communication control apparatus 2b according to the second embodiment is divided into pre-processing and communication start processing.

FIG. 18 is a flowchart illustrating the flow of the pre-processing by the communication control system Sb according to the second embodiment of the present invention.

First, the global wireless AP assignment unit 12 acquires, from the communication control apparatus 2b, information indicating regional characteristics and information indicating a wireless environment corresponding to the software wireless AP 3 to be controlled (step S501). The global wireless AP assignment unit 12 rearranges the plurality of wireless scheme files stored in the global wireless scheme storage 10 based on the acquired information indicating the regional characteristics and the information indicating the wireless environment (step S502). The AP integrated controller 1 extracts the top N wireless scheme files from among the rearranged wireless system files (step S1023). The global wireless AP assignment unit 12 saves the extracted top N wireless scheme files in the assignment DB 26b (step S504).

Thus, the processing illustrated in the flowchart of FIG. 18 ends.

As described above, the communication control system Sa according to the first embodiment of the present invention is a communication control system including the AP integrated controller 7 (management apparatus) and the communication control apparatus 2a.

The AP integrated controller 7 (management apparatus) includes a global wireless AP assignment unit 12 (communication parameter transmission unit) and a wireless scheme file download control unit 14 (setting file transmission unit). The global wireless AP assignment unit 12 (communication parameter transmission unit) assigns at least one wireless scheme (second communication parameter) that is a candidate for a wireless scheme (first communication parameter) to be assigned to the software wireless AP 3 (communication apparatus) and that is suitable for regional characteristics indicating a communication environment in a region where the software wireless AP 3 (communication apparatus) is installed. In response to a request from the communication control apparatus 2a, the wireless scheme file download control unit 14 (setting file transmission unit) transmits a wireless scheme (setting file) corresponding to at least one assigned wireless scheme (second communication parameter) to the communication control apparatus 2a.

Further, the communication control apparatus 2a includes a local scheduler 21a (communication parameter acquisition unit), a local wireless scheme storage 20a (setting file storage unit), a cache control unit 24a (setting file acquisition control unit), and a local wireless AP assignment unit 22a (communication parameter assignment unit). The local scheduler 21a (communication parameter acquisition unit) acquires at least one wireless scheme (second communication parameter) that is a candidate for a wireless scheme (first communication parameter) to be assigned to the software wireless AP 3 (communication apparatus) and that is suitable for regional characteristics indicating a communication environment in a region where the software wireless AP 3 (communication apparatus) is installed.

The local wireless scheme storage 20a (setting file storage unit) stores a wireless scheme file (setting file) corresponding to the acquired wireless scheme (second communication parameter).

The cache control unit 24a (setting file acquisition control unit) acquires a wireless scheme file (setting file) corresponding to the acquired wireless scheme (second communication parameter) and stores the acquired wireless system file (setting file) in the local wireless scheme storage 20a (setting file storage unit). The local wireless AP assignment unit 22a (communication parameter assignment unit) determines a wireless scheme (first communication parameter) to be assigned to the software wireless AP 3 (communication apparatus) from among the wireless schemes (second communication parameters) acquired by the local scheduler 21a (communication parameter acquisition unit) and assigns the determined wireless scheme (first communication parameter) to the software wireless AP 3 (communication apparatus).

With the above configuration, according to the communication control system Sa according to the first embodiment of the present invention, a wireless scheme file suitable for a region is selected in advance, and the selected wireless scheme file is distributed (cached) in the communication control apparatus 2a corresponding to each software wireless AP 3. Further, according to the communication control system Sa, the wireless scheme is appropriately determined by the combination of the setting contents of the communication setting items such as the primary modulation scheme, the secondary modulation scheme, the multiplexing scheme, and the interference control technology, and the communication is performed. As a result, according to the communication control system Sa, all the wireless scheme files are not downloaded to each software wireless AP 3 but are appropriately distributed (cached). As a result, the system load and the network load at the time of downloading the wireless scheme file are reduced, and the optimum wireless scheme according to the regional characteristics is appropriately determined and communication is performed.

the pre-processing of the communication control system Sb according to the second embodiment differs from the pre-processing by the communication control system Sa according to the first embodiment described with reference to FIG. 8 in that the global wireless AP assignment unit 12 stores the wireless scheme file in the assignment DB 26b as described above.

Figure 19:
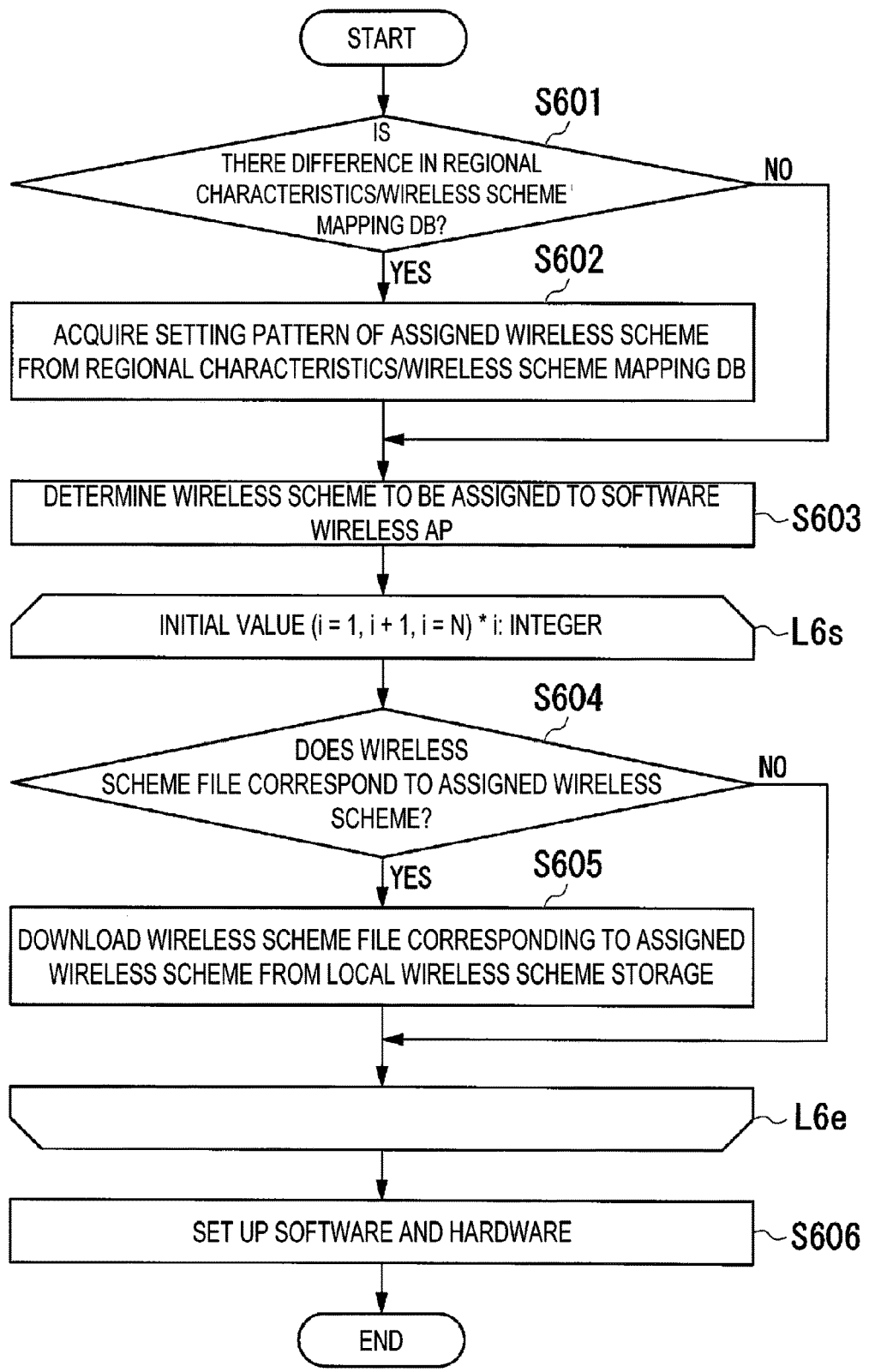
FIG. 19 is a flowchart illustrating a flow of communication start processing by the communication control system according to the second embodiment.

FIG. 19 is a flowchart illustrating the flow of communication start processing by the communication control system Sb according to the second embodiment of the present invention.

When there is a difference between the information stored in the regional characteristics/wireless scheme mapping DB 23a and the information stored in the assignment DB 26b (YES in step S601), the assignment DB 26b acquires a setting pattern corresponding to the assigned wireless scheme from the regional characteristics/wireless scheme mapping DB 23a (step S602). The assignment DB 26b determines a wireless scheme to be assigned to the software wireless AP 3 to be controlled (step S603).

Next, the processing from L6s to L6e in FIG. 19 is repeatedly executed the number of times (N times) corresponding to the N wireless scheme files stored in the local wireless scheme storage 20a.

The wireless scheme file download unit 31 confirms the wireless scheme file stored in the local wireless scheme storage 20a and downloads the wireless scheme file from the local wireless scheme storage 20a if the confirmed wireless scheme file is a wireless scheme file corresponding to the assigned wireless scheme (YES in step S604) (step S605).

When the wireless scheme is assigned, the wireless scheme file download unit 31 downloads a wireless scheme file corresponding to the assigned wireless scheme from the local wireless scheme storage 20. Also, when a wireless scheme is assigned, the wireless scheme hardware setting download unit 34 downloads wireless scheme hardware setting information corresponding to the assigned wireless scheme from the global wireless scheme storage 30.

The wireless scheme file setting unit 32 sets up the software unit 33 by using the wireless scheme file downloaded by the wireless scheme file download unit 31. The wireless scheme hardware setting unit 35 sets the hardware unit 36 by using wireless scheme hardware setting information downloaded by the wireless scheme hardware setting download unit 34 (step S606).

Thus, the processing illustrated in the flowchart of FIG. 19 ends.

Figure 20:
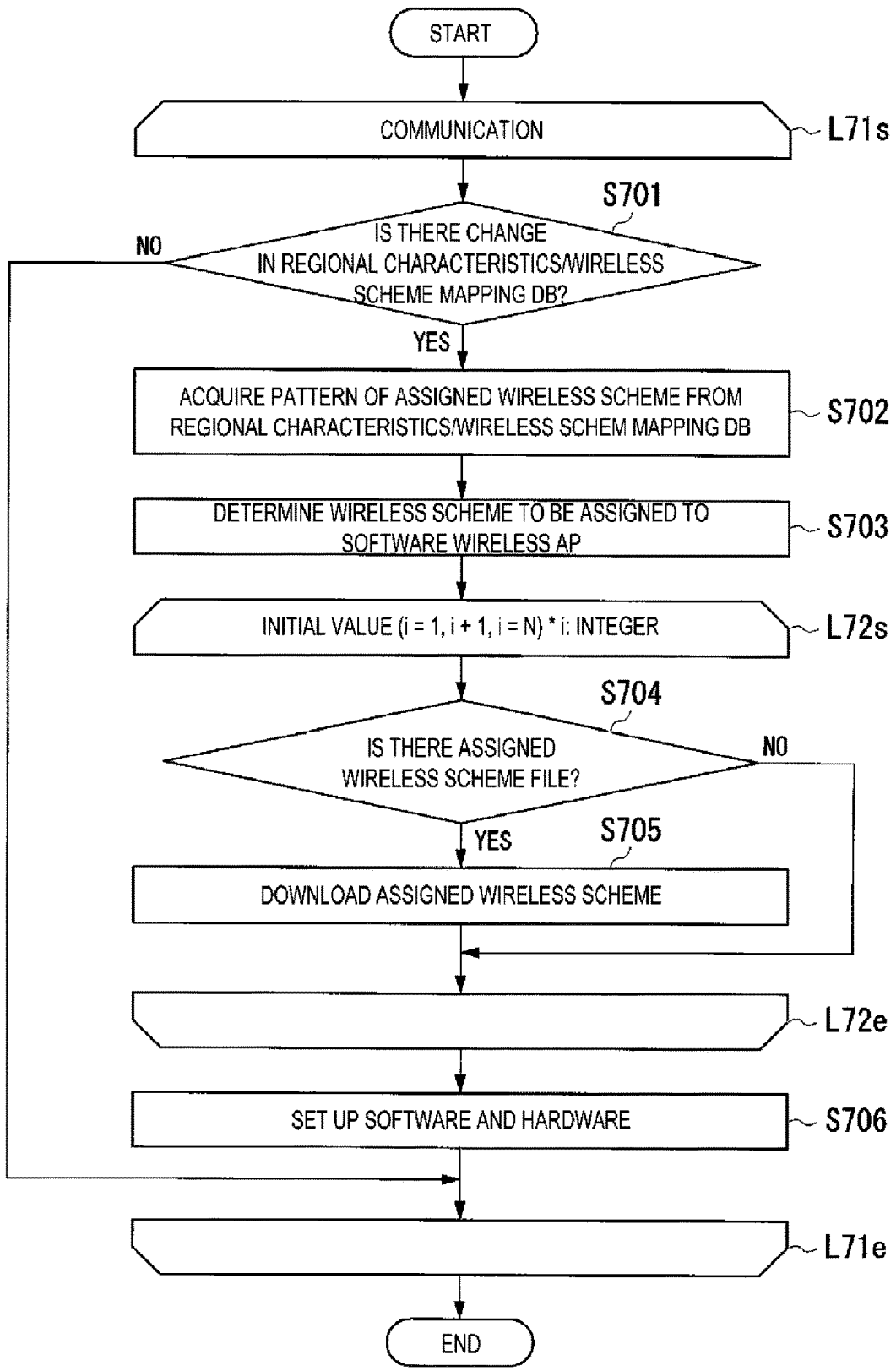
FIG. 20 is a flowchart illustrating a flow of processing of changing wireless scheme assignment based on regional characteristics and a wireless environment by the communication control system according to the second embodiment.

FIG. 20 is a flowchart illustrating a flow of processing of changing a wireless scheme assignment based on regional characteristics and a wireless environment by the communication control system Sb according to the second embodiment of the present invention. The flowchart of FIG. 20 illustrates a processing flow when there is a change in the regional characteristics and the wireless environment in a state where the communication in the wireless communication service provided by the software wireless AP 3 is continued.

While the communication in the wireless communication service provided by the software wireless AP 3 is in a state of being continued, the processing from L71s to L71e in FIG. 20 are repeatedly executed.

When there is a change in the regional characteristics/wireless scheme mapping DB 23b (YES in step S701), the assignment DB 26b acquires the setting pattern of the assigned wireless scheme from the regional characteristics/wireless scheme mapping DB 23a (step S702). The assignment DB 26b determines a wireless scheme to be assigned to the software wireless AP 3 based on the setting pattern of the acquired wireless scheme (step S407).

Next, the processing from L72s to L72e in FIG. 20 is repeatedly executed the number of times (N times) corresponding to the N wireless scheme files stored in the local wireless scheme storage 20a.

The wireless scheme file download unit 31 confirms the wireless scheme file stored in the local wireless scheme storage 20a and downloads the wireless scheme file from the local wireless scheme storage 20a if the confirmed wireless scheme file is a wireless scheme file corresponding to the assigned wireless scheme (YES in step S704) (step S705).

The wireless scheme file setting unit 32 sets up the software unit 33 by using the wireless scheme file downloaded by the wireless scheme file download unit 31. Similarly, the wireless scheme hardware setting unit 35 sets the hardware unit 36 by using the wireless scheme hardware setting information downloaded by the wireless scheme hardware setting download unit 34 (step S706).

Thus, the processing illustrated in the flowchart of FIG. 20 ends.

With the configuration of the communication control apparatus 2a and the communication control apparatus 2b according to the embodiments described above, the communication control apparatus 2a and the communication control apparatus 2b can appropriately determine a communication scheme and perform communication.

The embodiments of the present invention have been described above in detail with reference to the drawings. However, specific configurations are not limited to those embodiments, and include any design or the like within the scope not departing from the gist of the present invention.

Part or all of the communication control apparatus 2a and the communication control apparatus 2b in the above-described embodiments may be enabled by a computer. In that case, this configuration may be enabled by recording a program for implementing such control functions on a computer-readable recording medium and causing a computer system to read the program recorded on the recording medium for execution. The "computer system" here is a computer system built in the communication control apparatus 2a and the communication control apparatus 2b, and includes hardware such as an OS and peripheral devices. The "computer-readable recording medium" refers to a portable medium such as a flexible disk, a magneto-optical disk, a ROM, and a CD-ROM, and a storage apparatus such as a hard disk installed in a computer system.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a certain period of time, such as a volatile memory within the computer system for functioning as a server or a client in such a case. Furthermore, the program may be configured to realize some of the functions described above, and also may be configured to be capable of implementing the functions described above in combination with a program already recorded in the computer system.

Further, part or all of the communication control apparatus 2a and the communication control apparatus 2b in the above-described embodiments may be enabled as an integrated circuit such as a large scale integration (LSI). Each functional block of the communication control apparatus 2a and the communication control apparatus 2b may be individually formed into a processor, or a part or all may be integrated into a processor. Furthermore, a circuit integration technique is not limited to the LSI, and a part of or all of the transfer apparatus may be enabled with a dedicated circuit or a general-purpose processor. In a case that with advances in semiconductor technology, a circuit integration technology with which an LSI is replaced appears, an integrated circuit based on the technology may be used.

REFERENCE SIGNS LIST

1 AP integrated controller
2a, 2b Communication control apparatus (communication control device)
3 Software wireless AP
7 AP integrated controller
8 Software wireless AP
10 Global wireless scheme storage
11 Global scheduler
12 Global wireless AP assignment unit
13 AP management DB
14 Wireless scheme file download control unit
20a, 20b Local wireless scheme storage
21a, 21b Local scheduler
23a, 23b Regional characteristics/wireless scheme mapping DB
24a, 24b Cache control unit
25a Environment measurement unit
26b Assignment DB
31 Wireless scheme file download unit
32 Wireless scheme file setting unit
33 Software unit
34 Wireless scheme hardware setting download unit
35 Wireless scheme hardware setting unit
36 Hardware unit
70 Global wireless scheme storage
71 Global scheduler
72 Global wireless AP assignment unit
73 AP management DB
74 Download control unit
81 Wireless scheme file download unit
82 Wireless scheme file setting unit
83 Software unit
84 Wireless scheme hardware setting download unit
85 Wireless scheme hardware setting unit
86 Hardware unit

The invention claimed is:

1. A communication control apparatus comprising:
a processor; and
a non-transitory storage medium having computer program instructions stored thereon, wherein the computer program instructions, when executed by the processor, perform to:
measure communication status of a wireless access point;
determine regional characteristic information from the communication status of the wireless access point;
transmit the regional characteristics information indicating a communication environment in a region where the wireless access point resides to an access point integrated controller, the regional characteristics information including at least one of mobility of wireless communication terminals in the region, communication capacity requested by wireless communication terminals in the region, peak data amount of communication in the region, and number of wireless communication terminals in the region;
in response to the regional characteristics information, acquire a plurality of second communication parameters from the access point integrated controller;
wherein the second communication parameters are candidates for a first communication parameter indicating a wireless communication scheme to be assigned to the wireless access point, and
the second communication parameters indicates different wireless communication schemes suitable for the regional characteristics indicating the communication environment in the region where the wireless access point resides;
acquire wireless scheme files corresponding to each second communication parameter from the access point integrated controller and cause the acquired wireless scheme files to be stored; and
determine the first communication parameter from among the plurality of second communication parameters and assign the determined first communication parameter to the wireless access point.

2. The communication control apparatus according to claim 1, wherein the computer program instructions further perform to:
acquire only the wireless access point file that is not stored.

3. The communication control apparatus according to claim 1, wherein the computer program instructions further perform to:
delete the wireless scheme files other than a wireless scheme file corresponding to the second communication parameter from among the wireless scheme files.

4. The communication control apparatus according to claim 1, wherein the computer program instructions further perform to:
store regional characteristic communication parameter correspondence information in which the wireless access point, the regional characteristics, and the communication scheme suitable for the regional characteristics are associated; and
determine the first communication parameter to be assigned to the wireless access point based on the regional characteristic communication parameter correspondence information.

5. The communication control apparatus according to claim 4, wherein the computer program instructions further perform to:
determine the first communication parameter to be assigned to the wireless access point based on the updated regional characteristic communication parameter correspondence information, when the regional characteristic communication parameter correspondence information is updated.

6. The communication control apparatus according to claim 5, wherein the computer program instructions further perform to:

acquire the second communication parameter, when the regional characteristic communication parameter correspondence information is updated.

7. The communication control apparatus according to claim 1, wherein the computer program instructions further perform to:
determine the first communication parameter to be assigned to the wireless access point based on communication state information indicating a communication state of communication in the wireless access point.

8. The communication control apparatus according to claim 7, wherein the computer program instructions further perform to:
acquire the second communication parameter based on the communication state information.

9. The communication control apparatus according to claim 8, wherein the computer program instructions further perform to measure the communication state of communication by the wireless access point and generate the communication state information indicating the measured communication state.

10. A communication control method comprising:
measure communication status of a wireless access point;
determine regional characteristic information from the communication status of the wireless access point;
transmitting the regional characteristics information indicating a communication environment in a region where the wireless access point resides to access point integrated controller, the regional characteristics information including at least one of mobility of wireless communication terminals in the region, communication capacity requested by wireless communication terminals in the region, peak data amount of communication in the region, and number of wireless communication terminals in the region;
in response to the regional characteristics information, acquiring a plurality of second communication parameters from the access point integrated controller,
wherein the second communication parameter are candidates for a first communication parameter indicating a wireless communication scheme to be assigned to the wireless access point and,
wherein the second communication parameters indicates different wireless communication schemes suitable for the regional characteristics indicating the communication environment in the region where the wireless access point resides;
acquiring wireless scheme files corresponding to each second communication parameter from the access point integrated controller and cause the acquired wireless scheme files to be stored; and
determining the first communication parameter from among the acquired second communication parameters and assigning the determined first communication parameter to the wireless access point.

11. A communication control system comprising an access point integrated controller and a communication control apparatus, wherein
the access point integrated controller comprises:
a processor; and
a non-transitory storage medium having computer program instructions stored thereon, wherein the computer program instructions, when executed by the processor, perform to:
receive, from the communication control apparatus, regional characteristics information indicating a communication environment in a region where a wireless access point resides, the regional characteristics information including at least one of mobility of wireless communication terminals in the region, communication capacity requested by wireless communication terminals in the region, peak data amount of communication in the region, and number of wireless communication terminals in the region;
assign a plurality of second communication parameter from the access point integrated controller, the second communication parameters are candidates for a first communication parameter indicating a wireless communication scheme to be assigned to the wireless access point and the second communication parameters indicates different wireless communication schemes suitable for the regional characteristics indicating the communication environment in the region where the wireless access point resides, and
transmit wireless scheme files corresponding to the second communication parameters to the communication control apparatus in response to a request from the communication control apparatus, and
the communication control apparatus comprises:
a processor; and
a non-transitory storage medium having computer program instructions stored thereon, wherein the computer program instructions, when executed by the processor, perform to:
measure communication status of the wireless access point;
determine regional characteristic information from the communication status of the wireless access point;
transmit the regional characteristics information to the access point integrated controller;
acquire the plurality of second communication parameters from the access point integrated controller in response to the regional characteristic information,
acquire the wireless scheme files corresponding to each second communication parameter from the access point integrated controller and store the acquired wireless scheme files, and
determine the first communication parameter from among the plurality of second communication parameters and assign the determined first communication parameter to the wireless access point.

* * * * *